US012481238B2

(12) United States Patent
Saito

(10) Patent No.: US 12,481,238 B2
(45) Date of Patent: Nov. 25, 2025

(54) IMAGE FORMING APPARATUS

(71) Applicant: CANON KABUSHIKI KAISHA, Tokyo (JP)

(72) Inventor: Tomohiro Saito, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/585,733

(22) Filed: Feb. 23, 2024

(65) Prior Publication Data

US 2024/0288797 A1 Aug. 29, 2024

(30) Foreign Application Priority Data

Feb. 25, 2023 (JP) ................................ 2023-027854

(51) Int. Cl.
*G03G 15/00* (2006.01)
*G03G 15/16* (2006.01)

(52) U.S. Cl.
CPC ....... *G03G 15/5029* (2013.01); *G03G 15/168* (2013.01); *G03G 2215/00514* (2013.01); *G03G 2215/00734* (2013.01); *G03G 2215/00751* (2013.01)

(58) Field of Classification Search
CPC ............ G03G 15/5029; G03G 15/168; G03G 2215/00514; G03G 2215/00734; G03G 2215/00751
See application file for complete search history.

(56) References Cited

U.S. PATENT DOCUMENTS

| | | | | |
|---|---|---|---|---|
| 5,729,788 A * | 3/1998 | Hirohashi | G03G 15/168 399/388 |
| 2004/0131373 A1* | 7/2004 | Saito | G03G 15/1635 399/66 |
| 2015/0254535 A1* | 9/2015 | Suzuki | G06K 15/1868 358/1.6 |
| 2020/0150570 A1 | 5/2020 | Tsuno | |

FOREIGN PATENT DOCUMENTS

| | | |
|---|---|---|
| JP | 5-27605 A | 2/1993 |
| JP | 2002-207373 A | 7/2002 |
| JP | 2017-083818 A | 5/2017 |
| JP | 2020-075426 A | 5/2020 |

* cited by examiner

*Primary Examiner* — Carla J Therrien
(74) *Attorney, Agent, or Firm* — Venable LLP

(57) ABSTRACT

An image forming apparatus includes an image bearing member; a toner image forming portion, a transfer member, a voltage applying portion, an acquiring portion, and a controller. In continuous printing in which toner images are continuously transferred onto a first recording material and a second recording material, in a case that the first recording material is an envelope on the basis of recording material information, the controller carries out control so that a transfer member cleaning operation, in which a first cleaning voltage of the same polarity as a normal charge polarity of toner and a second cleaning voltage of an opposite polarity to the normal charge polarity of the toner are alternately applied by the voltage applying portion, is executed after the first recording material passes through the transfer portion and before the second recording material reaches the transfer portion.

10 Claims, 13 Drawing Sheets

(a)

(b)

(a)

(b)

IMAGE FORMING APPARATUS

FIELD OF THE INVENTION AND RELATED ART

The present invention relates to an image forming apparatus such as a copying machine, a printer, a facsimile machine, a printing machine, or a multi-function machine having a plurality of functions of these machines, of an electrophotographic type or an electrostatic recording type.

Conventionally, for example, in the image forming apparatus such as the copying machine of the electrophotographic type, in order to transfer a toner image, formed on an image bearing member, onto a recording material, a transfer member contacting the image bearing member is used. As the transfer member, for example, a rotatable transfer roller is widely used. To the transfer roller, a transfer voltage of an opposite polarity to a normal charge polarity of toner is applied, and the toner is electrostatically attracted to the recording material passing through a transfer portion, which is a contact portion between the image bearing member and the transfer roller, so that the toner image is transferred from the image bearing member onto the recording material. In the case where the toner image is transferred from an endless belt as the image bearing member onto the recording material, a voltage of the same polarity as the normal charge polarity of the toner is applied to a roller provided opposed to the transfer roller and disposed inside the belt, and the transfer roller is grounded in some instances.

In such an image forming apparatus, when the recording material is not present at the transfer portion, the transfer member is in a state in which the transfer member directly contacts the image bearing member. For that reason, for example, in the case where due to an occurrence of a jam (paper jam), the recording material is not conveyed (fed) to the transfer portion or in the like case, a surface of the transfer member is contaminated with the toner of the toner image on the image bearing member in some instances. Further, during pre-rotation before image formation or during post-rotation after the image formation, in a period corresponding to an interval between a recording material and a subsequent recording material in the case where continuous printing is carried out or in the like period, a state in which the image bearing member and the transfer member are in direct contact with each other occurs. For that reason, in these periods, when the toner remains on the image bearing member, the surface of the transfer member is contaminated with this toner in some cases.

In the image forming apparatus, in order to remove the surface contamination of the transfer member as described above, cleaning of the transfer member is performed in some instances. As a method of cleaning the transfer member, the following method is known. That is, during non-transfer in which there is no recording material in the transfer portion, a voltage of an opposite polarity to a voltage during the transfer is applied to the transfer member, so that an electric field in a direction opposite to an electric field during the transfer is formed between the transfer member and the image bearing member. By this, the toner deposited on the transfer member is moved to the image bearing member (Japanese Laid-Open Patent Application No. Hei 05-027605).

Incidentally, in the above-described image forming apparatus, in some cases, it is required that an image is formed on a flap (lid) of an envelope. However, there are various shapes of the flap of the envelope. For that reason, there is a possibility that the toner image formed on the image bearing member is protruded from the flap in the transfer portion.

Thus, when the toner image is transferred onto a region including the flap of the envelope, in the case where the toner image is protruded from the flap, the protruded toner image is deposited on the surface of the transfer member, so that the surface of the transfer member is contaminated with the toner of the toner image. Then, the toner deposited on a back surface (side) (a surface on a side opposite from a surface onto which the toner image is transferred at the transfer portion) of a subsequent recording material, so there is a possibility that back contamination of the recording material occurs.

SUMMARY OF THE INVENTION

Accordingly, a principal object of the present invention is to provide an image forming apparatus capable of suppressing contamination of a subsequent recording material with toner protruded from a flap of an envelope and deposited on a transfer member in the case where an image is formed on the flap of the envelope.

This object is accomplished by an image forming apparatus according to the present invention. According to an aspect of the present invention, there is provided an image forming apparatus comprising: an image bearing member; a toner image forming portion configured to form a toner image on the image bearing member; a transfer member forming a transfer portion between itself and the image bearing member in contact with the image bearing member and configured to transfer the toner image from the image bearing member onto a recording material in the transfer portion; an applying portion configured to apply a voltage for transferring the toner image from the image bearing member onto the recording material; an acquiring portion configured to acquire recording material information on a kind of the recording material; and a controller capable of controlling the applying portion, wherein in continuous printing in which toner images are continuously transferred onto a first recording material and a second recording material, in a case that the first recording material is an envelope on the basis of the recording material information, the controller carries out control so that a transfer member cleaning operation in which a first cleaning voltage of the same polarity as a normal charge polarity of toner and a second cleaning voltage of an opposite polarity to the normal charge polarity of the toner are alternately applied by the applying portion is executed after the first recording material passes through the transfer portion and before the second recording material reaches the transfer portion.

Further features of the present invention will become apparent from the following description of exemplary embodiments with reference to the attached drawings.

Figure 3:
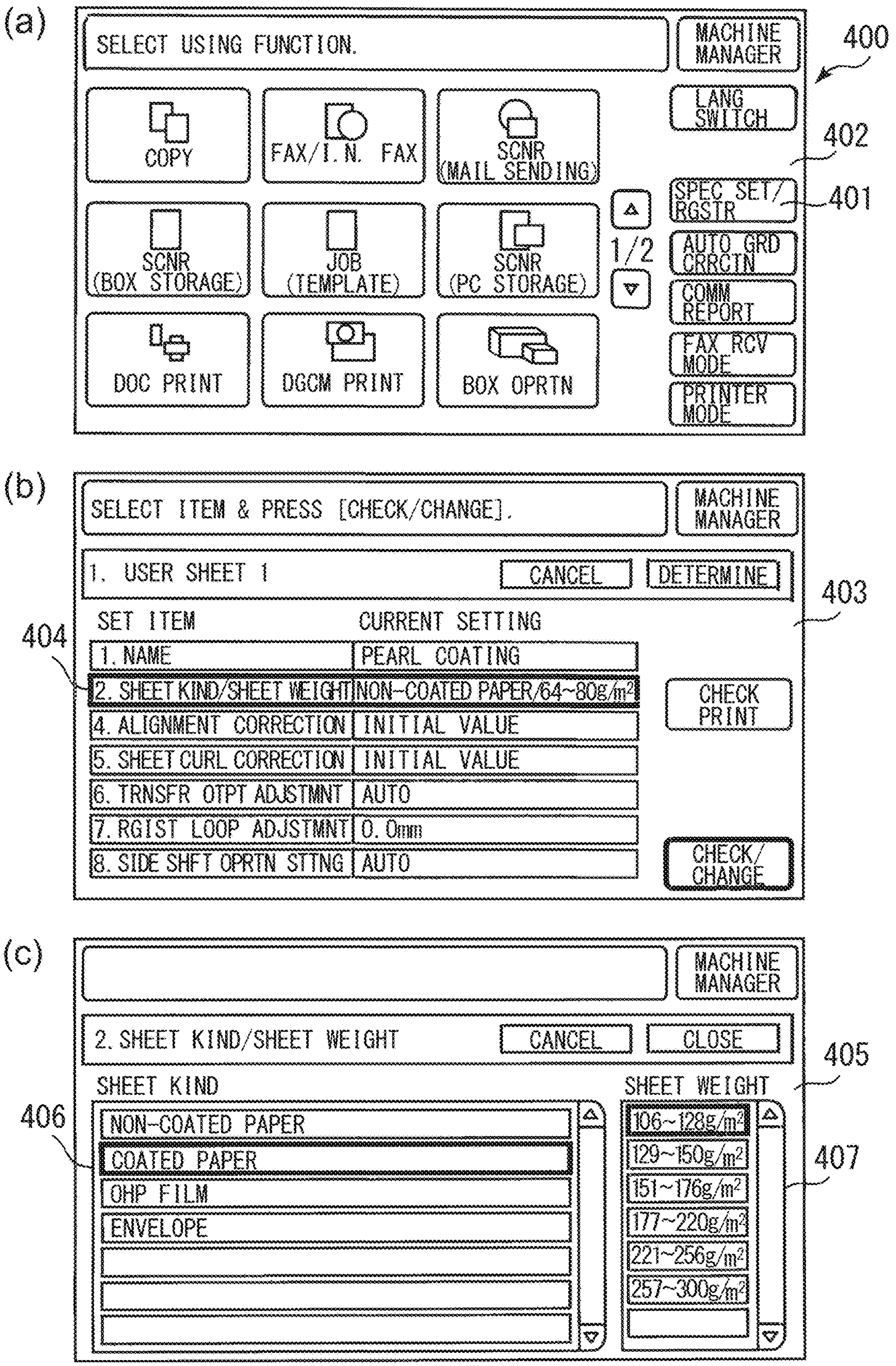

Parts (a) to (c) of FIG. 3 are schematic views each showing an example of a display screen.

Figure 4:
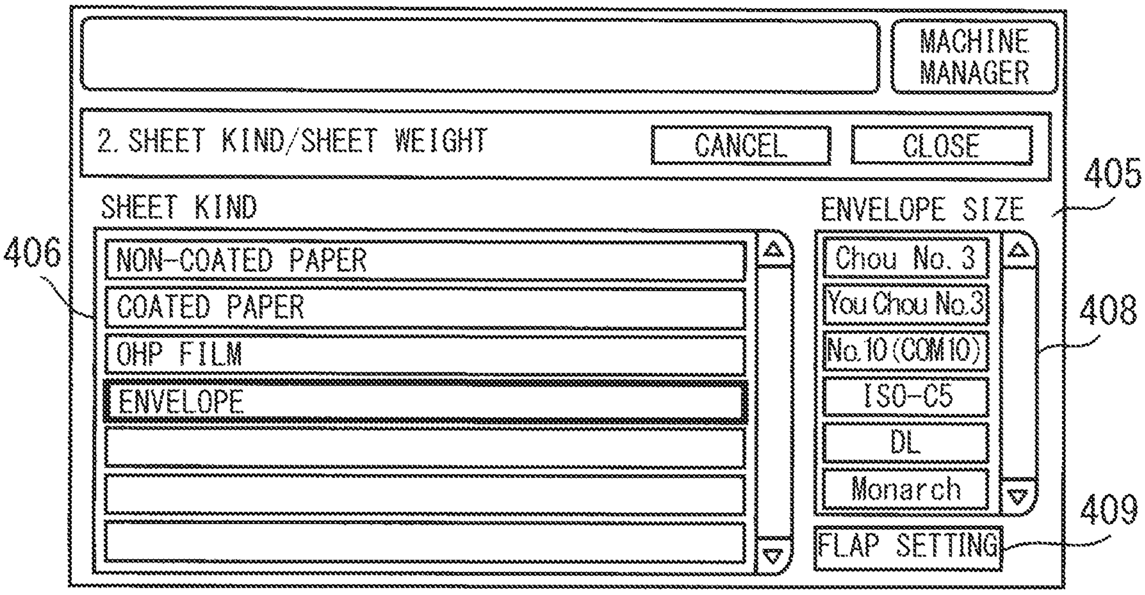
Figure 4:
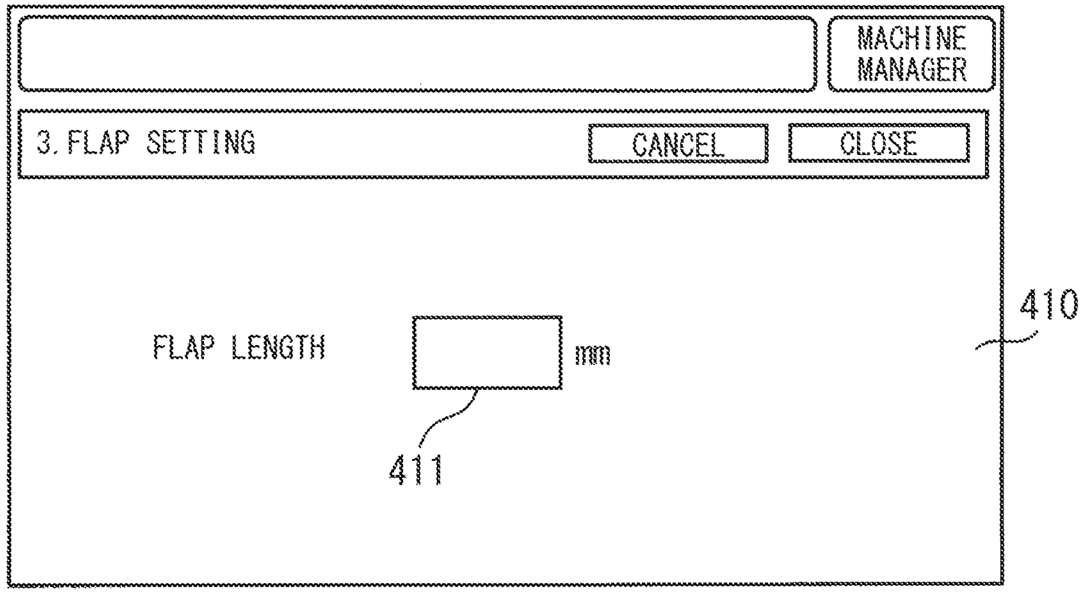

Parts (a) and (b) of FIG. 4 are schematic views each showing an example of a display screen.

Figure 5:
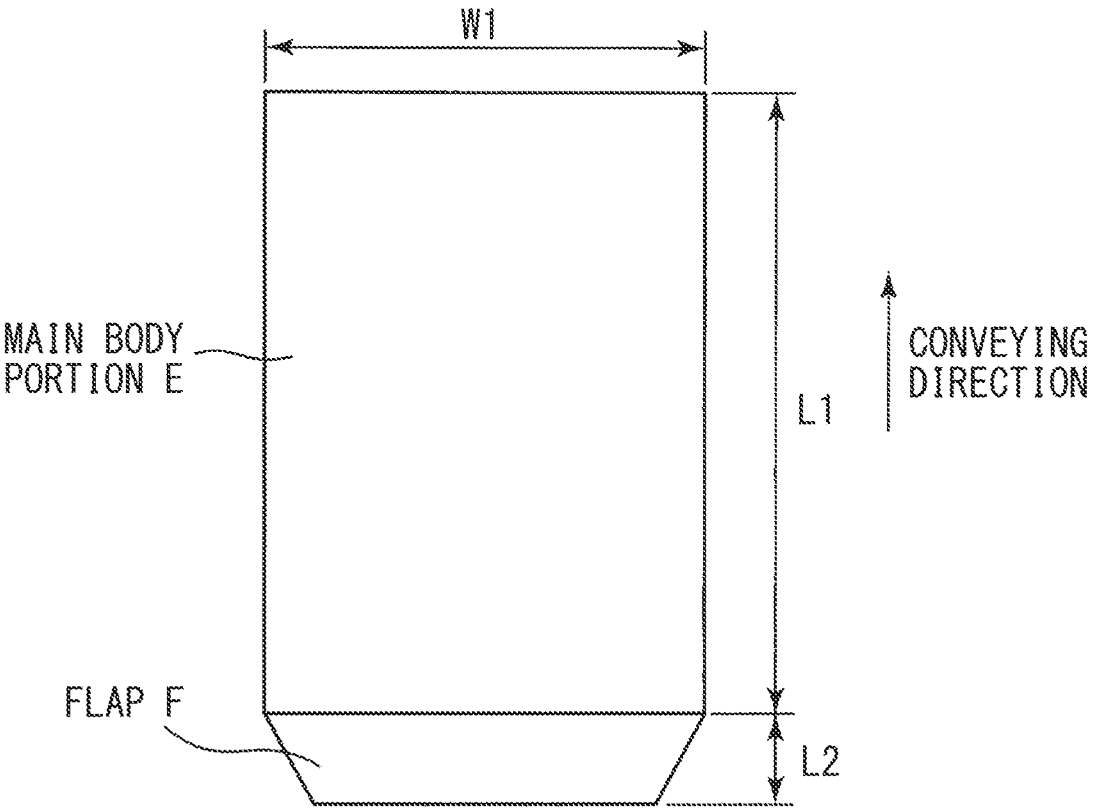

FIG. 5 is a schematic view of an envelope.

Figure 6:
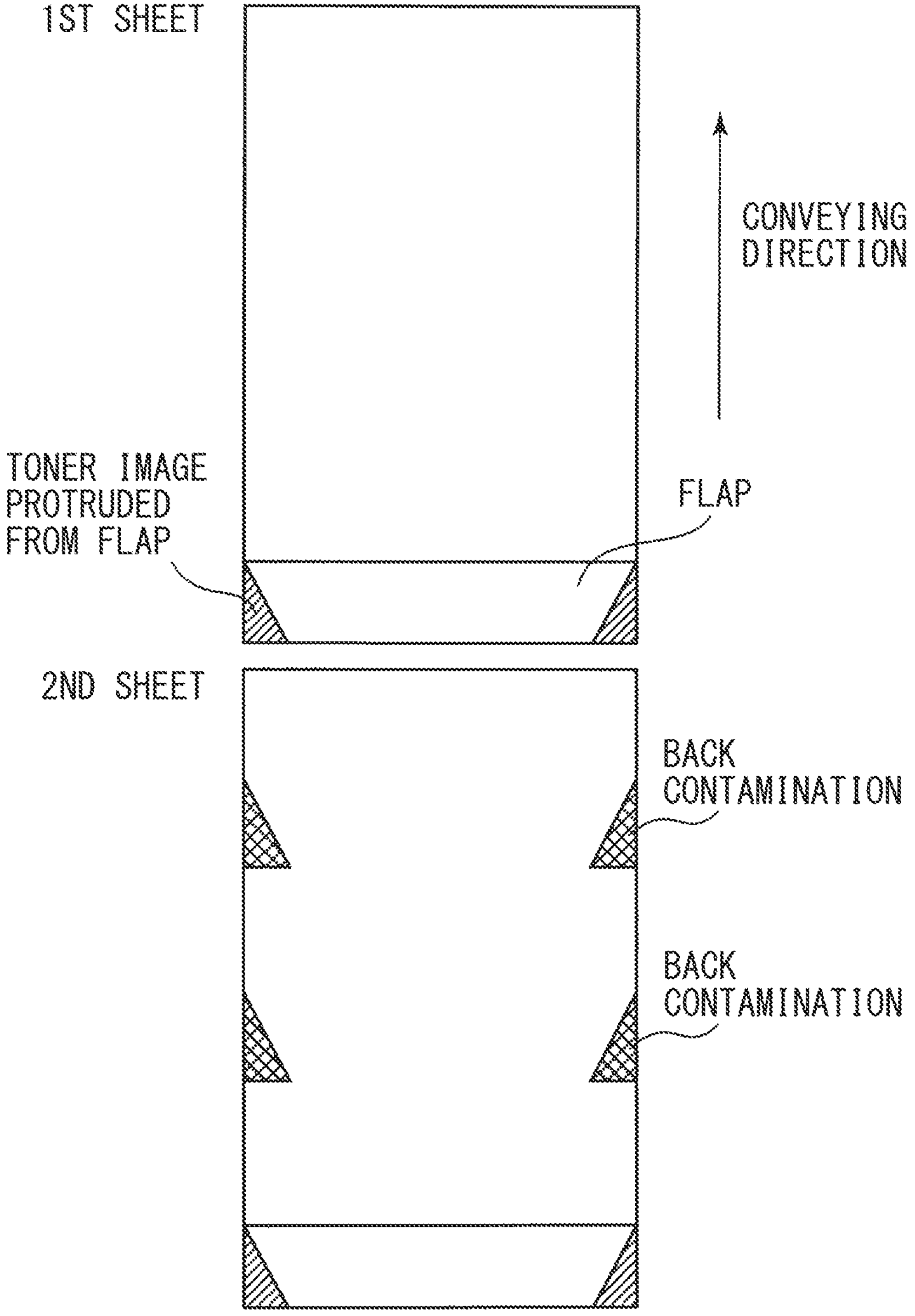

FIG. 6 is a schematic for illustrating back contamination due to a toner image protruded from a flap of the envelope.

Figure 7:
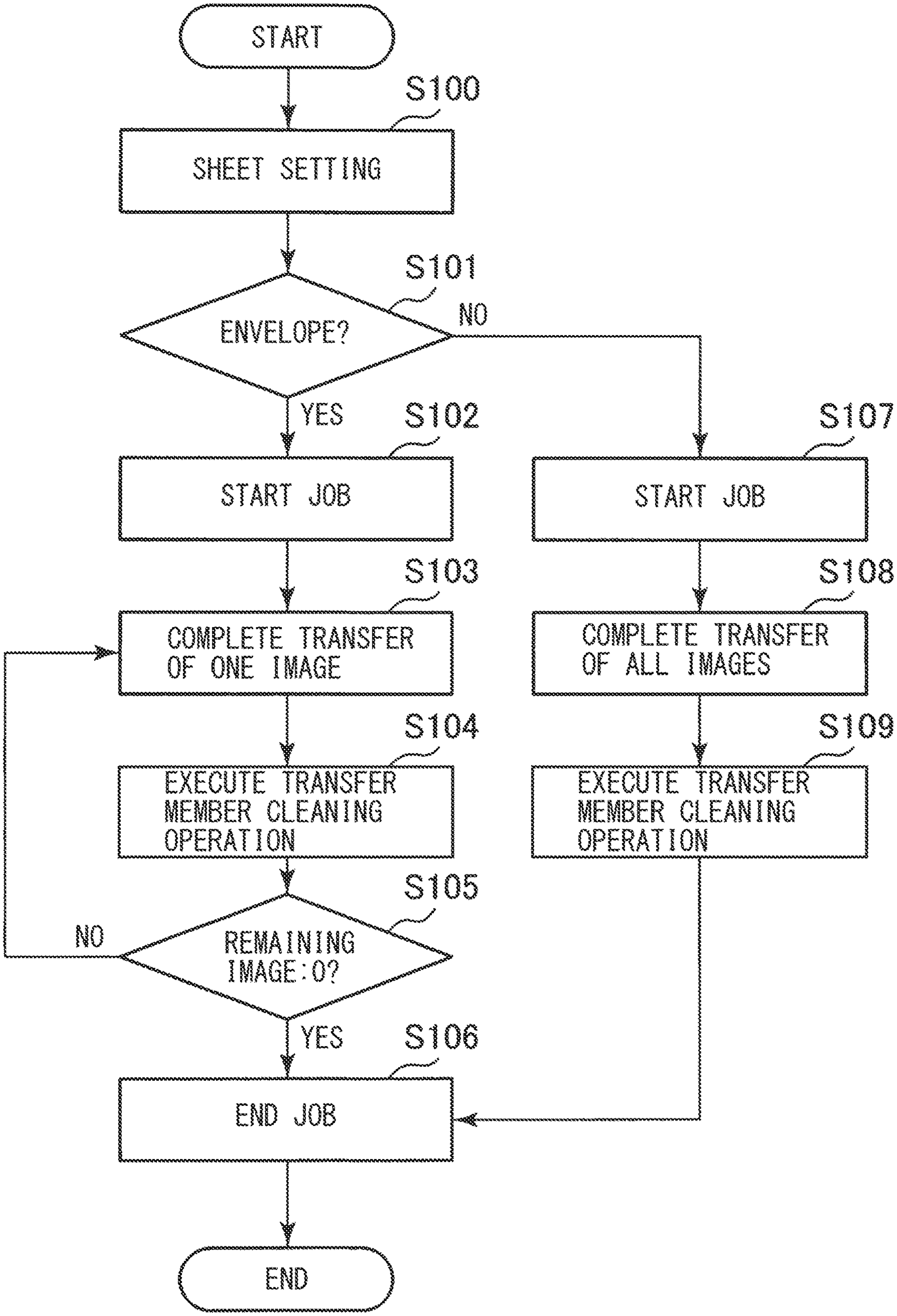

FIG. 7 is a flowchart of control in an embodiment 1.

Figure 8:
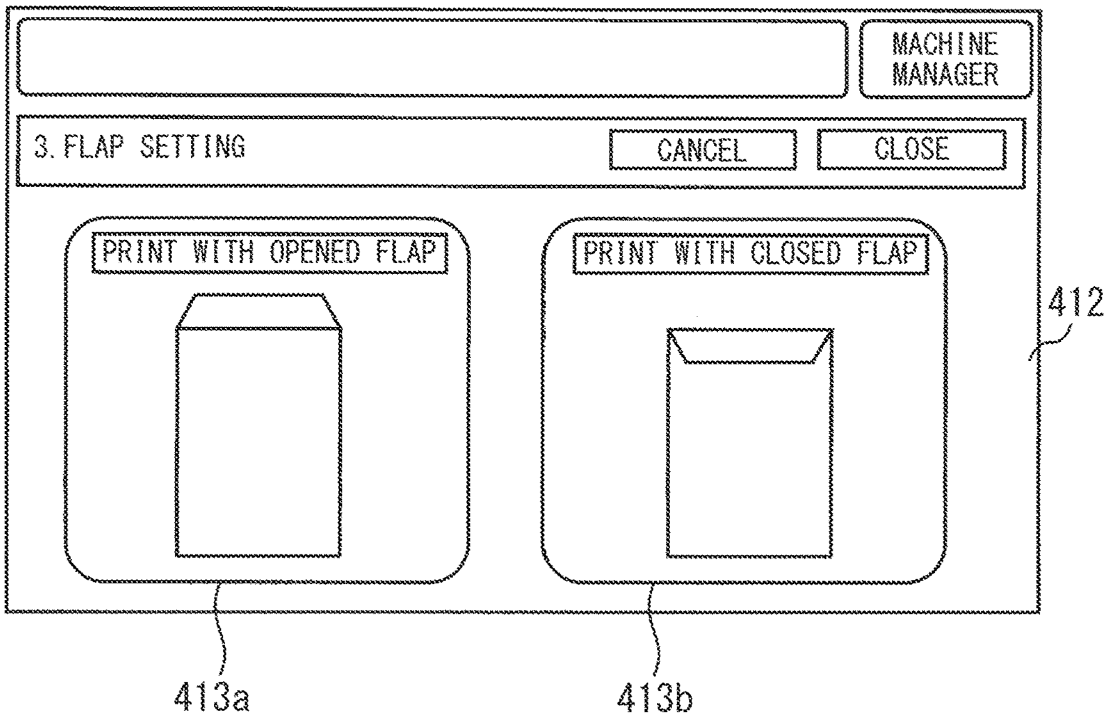
Figure 8:
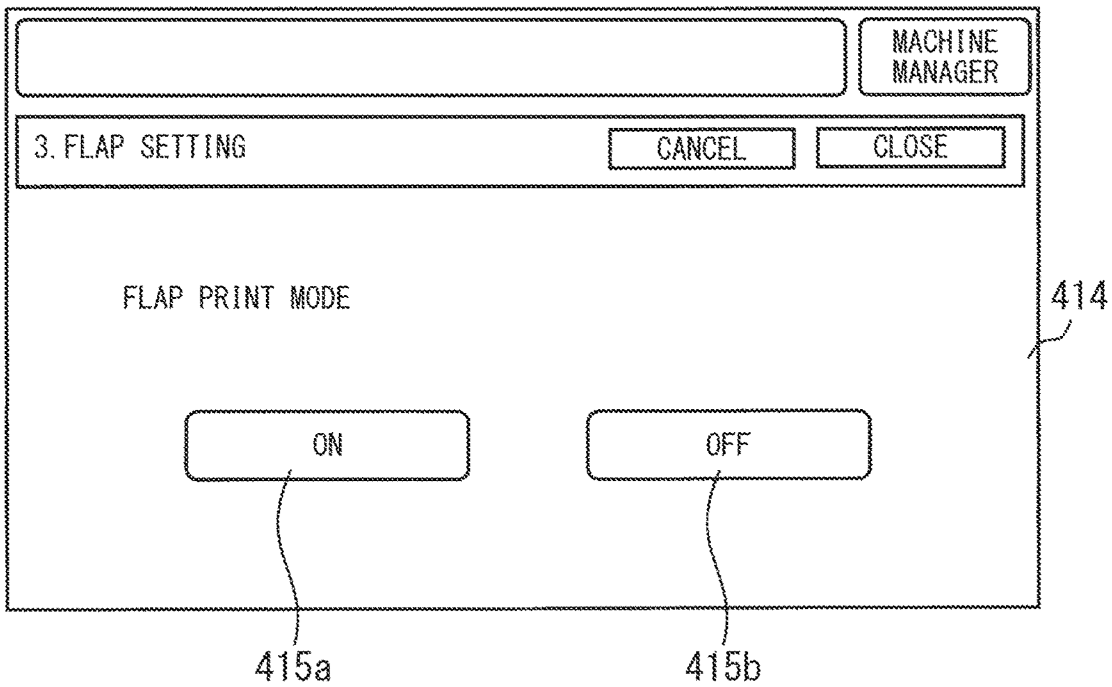

Parts (a) and (b) of FIG. 8 are schematic views each showing another example of a display screen.

Figure 9:
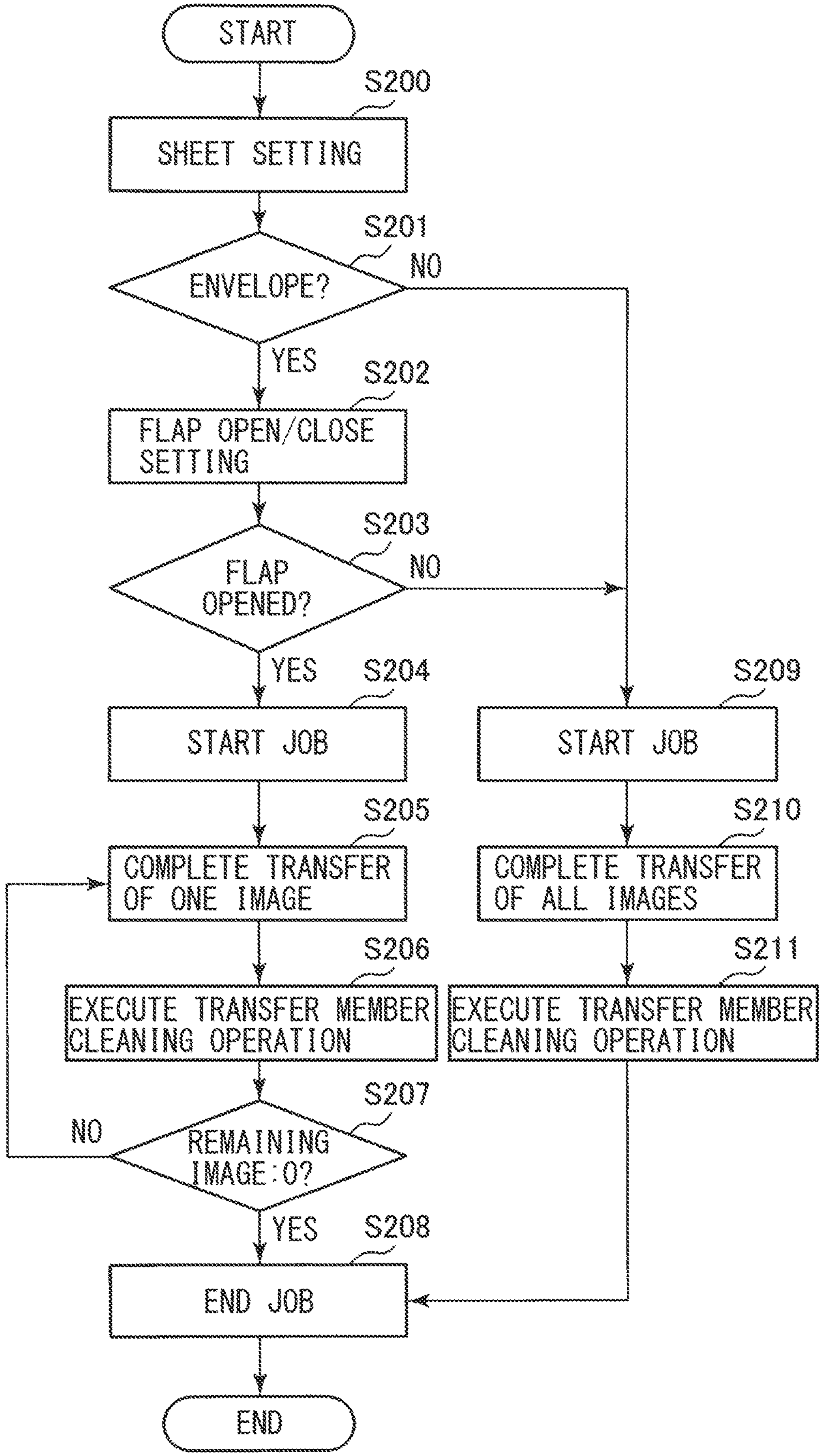

FIG. 9 is a flowchart of control in an embodiment 2.

Figure 10:
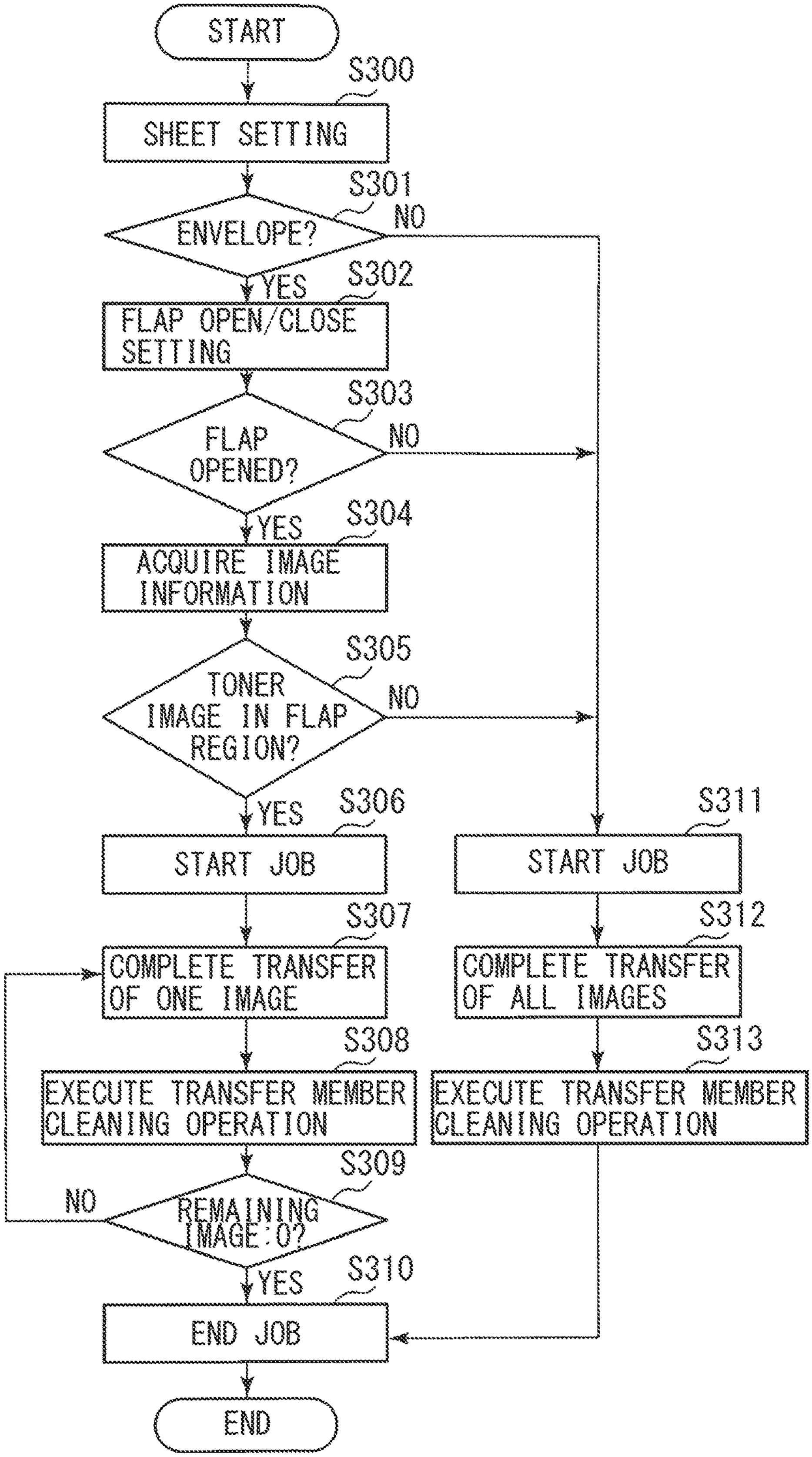

FIG. 10 is a flowchart of control in an embodiment 3.

Figure 11:
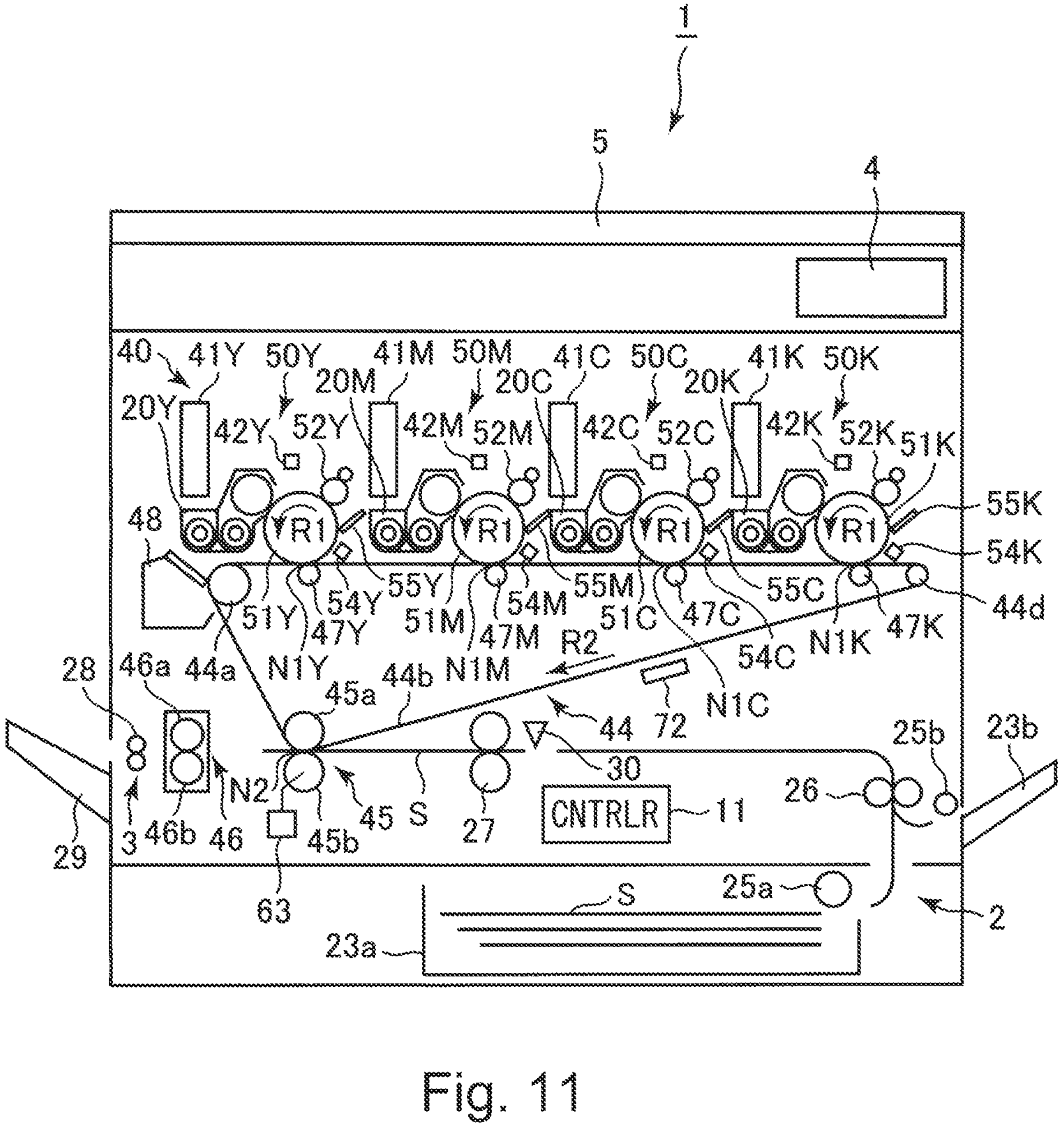

FIG. 11 is a schematic sectional view of an image forming apparatus of an embodiment 4.

Figure 12:
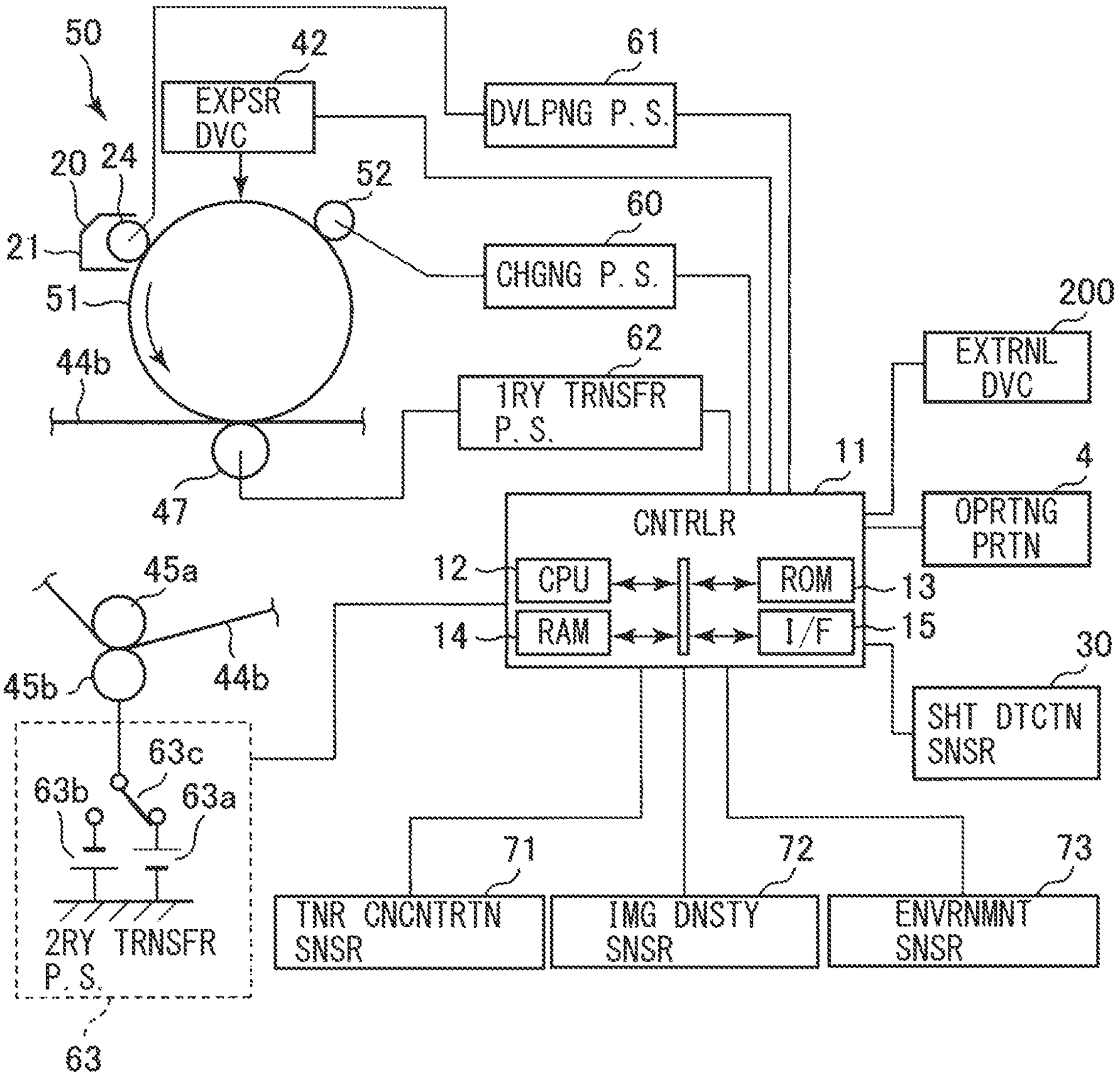

FIG. 12 is a schematic view showing a control constitution of the image forming apparatus of the embodiment 4.

Figure 13:
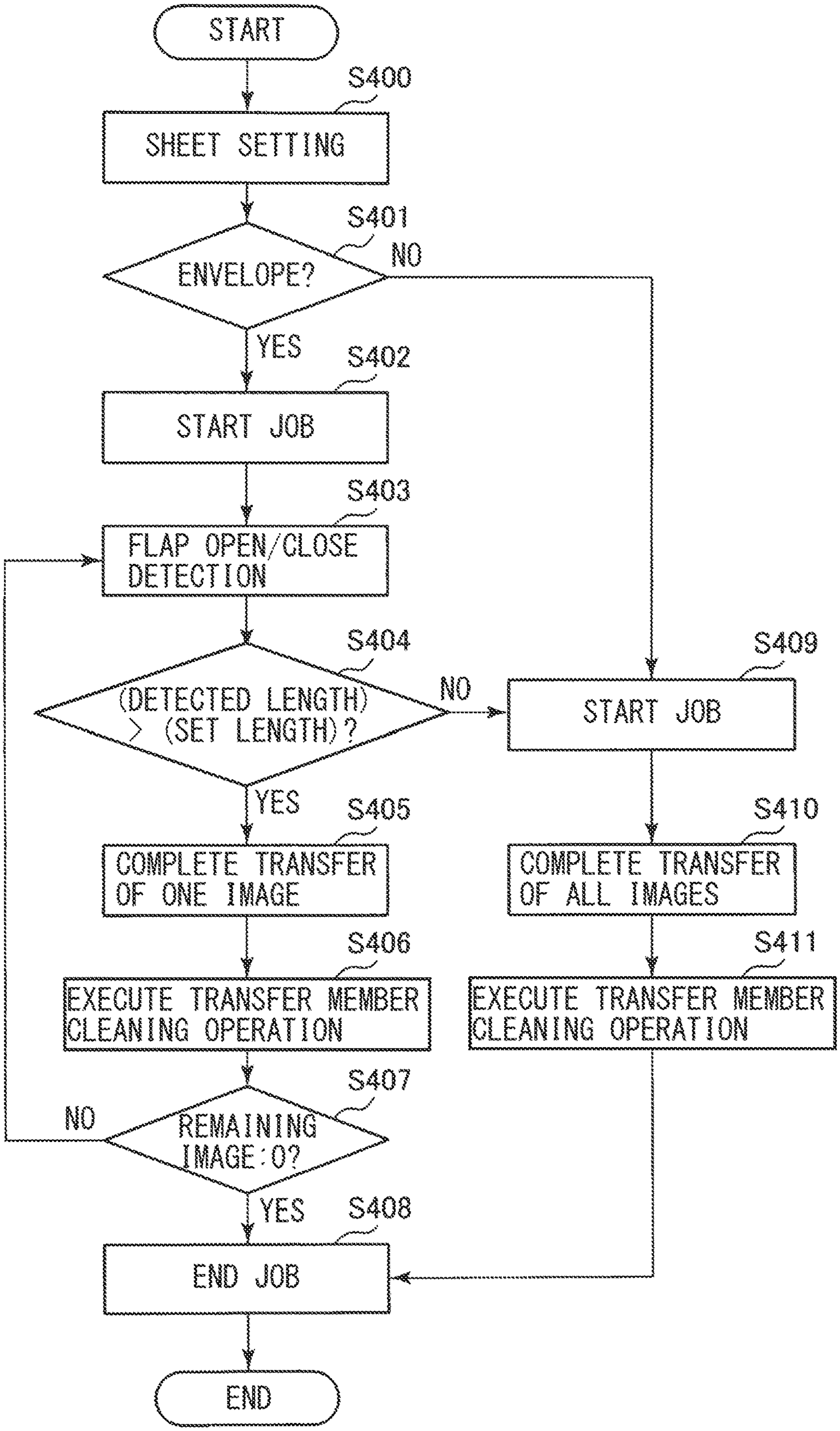

FIG. 13 is a flowchart of control in the embodiment 4.

DESCRIPTION OF EMBODIMENTS

In the following, the image forming apparatus according to the present invention will be described in more detail with reference to the drawings.

EMBODIMENT 1

1. General structure and operation of image forming apparatus

Figure 1:
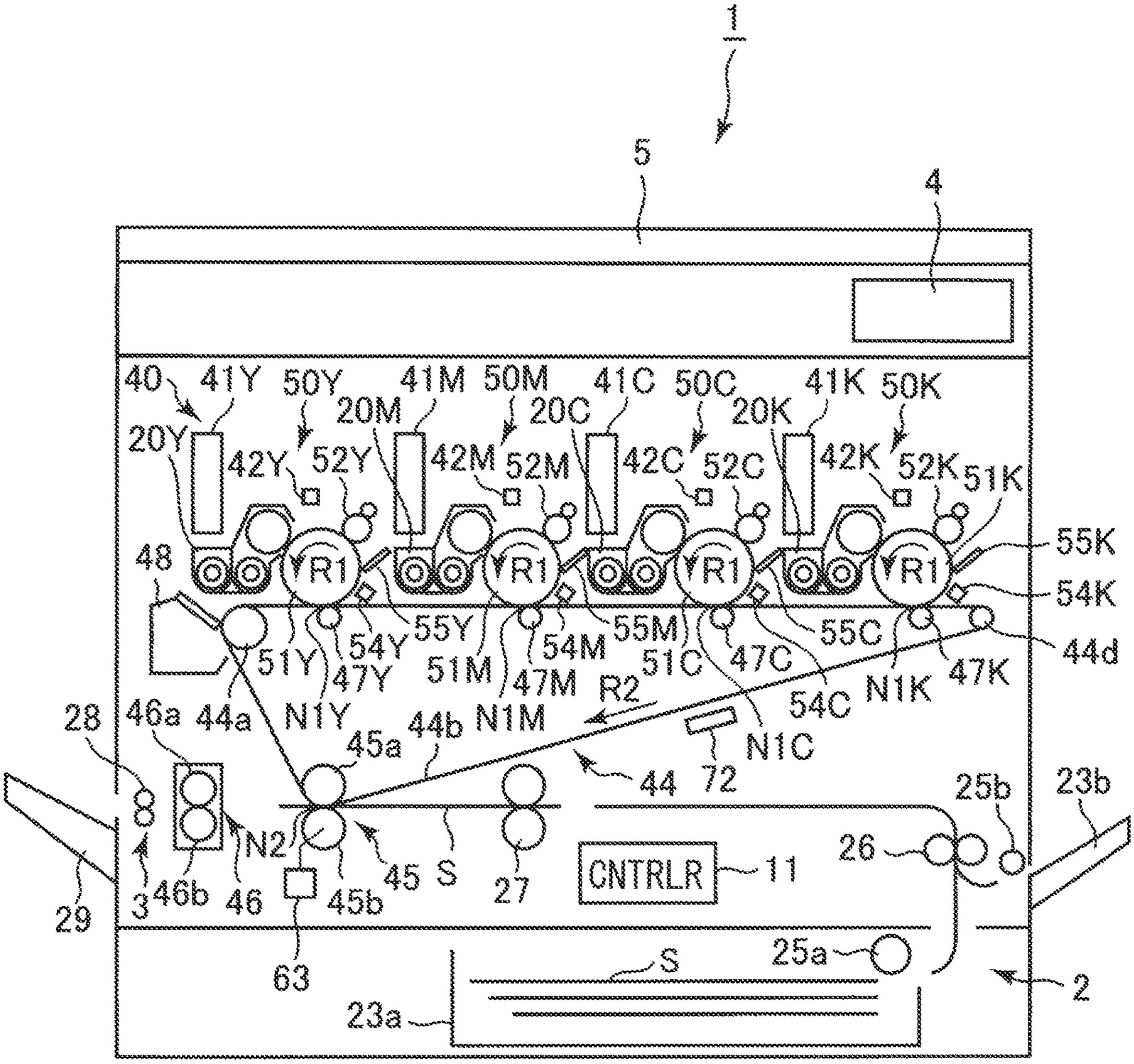
FIG. 1 is a schematic sectional view of an image forming apparatus.

First, a general structure and an operation of the image forming apparatus of this embodiment will be described. FIG. 1 is a schematic sectional view of an image forming apparatus 1 of this embodiment. The image forming apparatus 1 of this embodiment is a tandem type full-color image forming apparatus capable of forming a full-color image on a recording material (transfer (-receiving) material, recording medium, sheet) S by using an electrophotographic type process and employing an intermediary transfer type system. The image forming apparatus 1 of this embodiment is a multi-function machine not only functioning as a full-color copying machine or a facsimile machine, but also functioning as a full-color printer for forming an image on the basis of image information (image signal, image data) outputted from a personal computer or the like.

The image forming apparatus 1 includes a feeding portion 2 of the recording material S, image forming portion 40, a discharging portion 3 of the recording material S, a controller 11, an operating portion 4, and an image reading apparatus 5. The image forming apparatus 1 is capable of forming an image on the recording material S on the basis of image information acquired by the image reading apparatus (original reading apparatus) provided on the image forming apparatus 1. Further, the image forming apparatus 1 is capable of forming an image on the recording material S on the basis of image information from an external device 200 (FIG. 2), a host device such as a personal computer, a digital camera, or a smartphone, which are connected to the image forming apparatus 1. Here, the recording material S is a material on which a toner image is formed, and specific examples thereof include plain paper, a synthetic resin sheet which is a substitute for the plain paper, thick paper, an overhead projector sheet (OHP film), metalized paper, an envelope, and the like. Incidentally, the recording material S is referred to as "paper" (or "sheet") in some instances, but even in that case, the recording material S includes a material other than the paper or a recording material formed with a material containing the material other than the paper.

The image forming portion 40 forms the image on the recording material S fed from the feeding portion 2, on the basis of the image information. The image forming portion 40 includes image forming units 50Y, 50M, 50C, 50K, toner bottles 41Y, 41M, 41C, 41K, exposure devices 42Y, 42M, 42C, 42K, an intermediary transfer unit 44, a secondary transfer device 45, and a fixing device 46. The image forming units 50Y, 50M, 50C, and 50K form toner images of colors of yellow (Y), magenta (M), cyan (C), and black (K), respectively. Elements having the same or corresponding functions or structures provided for the respective colors will be collectively described by omitting suffixes Y, M, C, and K for representing elements for associated colors, respectively, in some instances. Further, the image forming apparatus 1 can also form, for example, a monochromatic image such as a black (monochromatic) image or a multi-color image by using one or some image forming units 50 of the four image forming units 50.

The image forming unit 50 includes a photosensitive drum 51, which is a rotatable drum-type (cylindrical) photosensitive member (electrophotographic photosensitive member), as a first image bearing member for bearing a toner image. In addition, the image forming unit 50 includes a charging roller 52, which is a roller-shaped charging member, as charging means. In addition, the image forming unit 50 includes a developing device 20 as developing means. In addition, the image forming unit 50 includes a pre-exposure device 54 as a discharging (charge eliminating) means. In addition, the image forming unit 50 includes a drum cleaning device 55 as a photosensitive member cleaning means. The image forming unit 50 may constitute a cartridge (process cartridge) integrally detachably mountable to an apparatus main assembly 10 of the image forming apparatus 1. Further, for example, the photosensitive drum 51, the charging roller 52, and the drum cleaning device 55 may integrally constitute a cartridge detachably mountable to the apparatus main assembly 10, and the developing device 20 may substantially singly constitute a cartridge detachably mountable to the apparatus main assembly 10. Further, at least one the photosensitive drum 51, the charging roller 52, and the drum cleaning device 55 may substantially singly constitute a cartridge detachably mountable to the apparatus main assembly 10. The apparatus main assembly 10 is a portion obtained by excluding the above-described cartridge(s) from the image forming apparatus 1.

In this embodiment, the photosensitive drum 51 is a negatively chargeable organic photosensitive member (OPC) having an outer diameter of 30 mm. The photosensitive drum 51 includes, on a surface of an aluminum cylinder as a substrate, a surface layer formed on the surface of the substrate, including three layers of an undercoat layer, a photocharge generation layer, and a charge transportation layer, which are applied and laminated on the substrate in the order named. The photosensitive drum 51 is rotationally driven in a direction indicated by an arrow R1 (counter-clockwise direction) in the figure at a predetermined peripheral speed (process speed), for example, 210 mm/see, by a driving motor (not shown) as a driving means.

In this embodiment, the charging roller 52 is a rubber roller including a core metal and a rubber layer as an elastic layer formed at a periphery of the core metal. The charging roller 52 is disposed in contact with the surface of the photosensitive drum 51 and is rotated by the rotation of the photosensitive drum 51. The surface of the rotating photosensitive drum 51 is electrically charged uniformly to a predetermined polarity (negative in this embodiment) and a predetermined potential by the charging roller 52. To the charging roller 52, a charging power source (high-voltage power source) 60 (FIG. 2) as a charging voltage applying means (charging voltage applying portion) is connected. The charging power source 60 applies a predetermined charging voltage (charging bias) which is a DC voltage to the charging roller 52 during the charging process.

In this embodiment, the exposure device 42 as an exposure means is constituted by a laser scanner (laser exposure optical system). The surface of the charged photosensitive drum 51 is scanned and exposed by the exposure device 42 so that an electrostatic latent image (electrostatic image) is formed on the photosensitive drum 51. The exposure device 42 for each color emits laser light in accordance with corresponding separated color image information outputted from the controller 11, and irradiates the surface of the photosensitive drum 51 for each color with the laser light.

The electrostatic latent image formed on the photosensitive drum 51 is developed (visualized) by supplying the toner thereto by the developing device 20, so that a toner image (developer image) is formed on the photosensitive drum 51. In this embodiment, the developing device 20 is a two-component developing device using, as a developer, a two-component developer comprising toner (non-magnetic toner particles) and a carrier (magnetic carrier particles). In a developing container (developing main body) 21 (FIG. 2) of the developing device 20, the two-component developer is accommodated, toner in an amount corresponding to a consumed amount of the toner is supplied from the toner bottle 41. The developing device 20 includes a developing sleeve 24 (FIG. 2) as a developing member (developer carrying member). The developing sleeve 24 is made of, for example, a nonmagnetic material such as aluminum or nonmagnetic stainless steel. Inside the developing sleeve 24, a magnet roller (not shown) which is a roller-shaped magnetic field-generating member as a magnetic field generating means is fixed and arranged so as not to rotate relative to the developing container 21. The developing sleeve 24 carries the two-component developer comprising the toner and the carrier and conveys it to a developing region opposing the photosensitive drum 51. Then, in the developing region, the toner is moved to and deposited on an image portion of the electrostatic latent image on the photosensitive drum 51 from the two-component developer on the developing sleeve 24. A developing power source (high-voltage power source) 61 (FIG. 2) as a developing voltage applying means developing voltage applying portion) is connected to the developing sleeve 24. The developing power source 61 applies a predetermined developing voltage (developing bias) which is a DC voltage to the developing sleeve 24 during the development. In this embodiment, on an exposed portion (image portion) of the photosensitive drum 51 lowered in absolute value of the potential by being exposed after being uniformly charged, the toner charged to the same polarity (negative polarity in this embodiment) as the charge polarity of the photosensitive drum 51 is deposited (reverse development type). In this embodiment, the normal charge polarity of the toner, which is a principal charge polarity of the toner during the development, is the negative polarity.

The intermediary transfer unit 44 is provided so as to be opposed to the four photosensitive drums 51Y, 51M, 51C, and 51K. The intermediary transfer unit 44 includes an intermediary transfer belt 44*b*, which is an intermediary transfer member constituted by a rotatable endless belt (a second image bearing member) for bearing the toner image. The intermediary transfer belt 44*b* is wound around, and stretched by, as a plurality of stretching rollers, a driving roller 44*a*, a tension roller 44*d*, and an inner secondary transfer roller 45*a*. The driving roller 44*a* is rotationally driven by a driving motor (not shown) as a driving source constituting a driving means, so that a driving force is transmitted to the intermediary transfer belt 44*b*. By this, the intermediary transfer belt 44*b* is rotated (circulated and moved) in an arrow R2 direction (clockwise direction) in FIG. 1 at a predetermined peripheral speed corresponding to the peripheral speed of the photosensitive drum 51. The tension roller 44*d* controls the tension of the intermediary transfer belt 44*b* to be constant. The inner secondary transfer roller 45*a* constitutes a secondary transfer device 45 in combination with an outer secondary transfer roller 45*b* (described hereinafter). On the inner peripheral surface side of the intermediary transfer belt 44*b*, primary transfer rollers 47Y, 47M, 47C, 47K, which are roller shaped primary transfer members as primary transfer means, are provided correspondingly to the photosensitive drums 51Y, 51M, 51C, 51K, respectively. In this embodiment, the primary transfer rollers 47 are disposed opposed to the photosensitive drums 51 while nipping the intermediary transfer belt 44*b* between themselves and the photosensitive drums 51. Each of the primary transfer roller 47 is pressed toward the photosensitive drum 51 and contacts the photosensitive drum 51 by way of the intermediary transfer belt 44*b*, and forms a primary transfer portion (primary transfer nip) N1, which is a contact portion between the photosensitive drum 51 and the intermediary transfer belt 44*b*.

A primary transfer power source 62 (FIG. 2) as a primary transfer voltage applying means (primary transfer voltage applying portion) is connected to the primary transfer roller 47. The toner image formed on the photosensitive drum 51 is transferred (primary-transferred) onto the intermediary transfer belt 44*b* rotating as a transfer-receiving member in the primary transfer portion N1. During the primary transfer, the primary transfer power source 62 applies a primary transfer voltage (primary transfer bias) which is a DC voltage having a polarity opposite to the normal charge polarity of the toner (positive polarity in this embodiment) to the primary transfer roller 47. In this embodiment, to the primary transfer roller 47, the primary transfer voltage which is subjected to constant-voltage control is applied. For example, during full-color image formation, the toner images of the colors of Y, M, C, and K formed on the photosensitive drums 51Y, 51M, 51C, and 51K are multiple-transferred successively onto the intermediary transfer belt 44*b*.

On an outer peripheral surface side of the intermediary transfer belt 44*b*, the outer secondary transfer roller 45*b* which is a roller-shaped secondary transfer member as a secondary transfer means is provided. The secondary transfer device 45 is constituted by including the inner secondary transfer roller 45*a* functioning as an opposing member (opposite electrode) and the outer secondary transfer roller 45*b* which is a secondary transfer member. The outer secondary transfer roller 45*b* is disposed opposed to the inner secondary transfer roller 45*a* by way of the intermediary transfer belt 44*b*. The outer secondary transfer roller 45*b* is pressed toward the inner secondary transfer roller 45*a* and contacts the inner secondary transfer roller 45*a* by way of the intermediary transfer belt 44*b*, and forms a secondary transfer portion (secondary transfer nip) N2 which is a contact portion between the intermediary transfer belt 44*b* and the outer secondary transfer roller 45*b*. To the outer secondary transfer roller 45*b*, a secondary transfer power source (high-voltage power source) 63 (FIG. 2) as a secondary transfer voltage applying means (secondary transfer applying portion) is connected. The toner image formed on the intermediary transfer belt 44*b* is transferred (secondary-transferred) in the secondary transfer portion onto the recording material S as a transfer (toner image)-receiving member conveyed by being nipped between the intermediary transfer belt 44*b* and the outer secondary transfer roller 45*b*. During the secondary transfer, to the outer secondary transfer roller 45*b*, the secondary transfer power source 63 applies a secondary transfer voltage (secondary transfer bias) which is a DC voltage of the opposite polarity (positive polarity in this embodiment) to the normal charge polarity of the toner. The core metal of the inner secondary transfer roller 45*a* is connected to the ground potential. In this embodiment, when the recording material S is supplied to the secondary transfer portion N2, the secondary transfer voltage subjected to the constant-voltage control is applied to the outer secondary transfer roller 45*b*. For example, the secondary transfer voltage of 1 to 7 kV is applied to the outer secondary transfer roller 45*b*, and thus a secondary transfer current of 40-120 μA is caused to flow through the secondary transfer portion N2, so that the toner image on the intermediary transfer belt 44*b* is secondary-transferred onto the recording material S. A constitution in which the secondary transfer voltage of the same polarity as the normal charge polarity of the toner is applied to the inner secondary transfer roller 45*a* and in which the outer secondary transfer roller 45*b* is connected to the ground potential may be employed. In this case, to the outer secondary transfer roller 45*b* as the transfer member, the secondary transfer voltage is applied by way of the inner secondary transfer roller 45*a*. In this embodiment, an outer diameter of the outer secondary transfer roller 45*b* is 20-25 mm. In this embodiment, the outer secondary transfer roller 45*b* includes a core metal and an elastic layer of an ion conductive foam rubber (NBR rubber) formed at a periphery of the core metal. Further, in this embodiment, an electric resistance value of the outer secondary transfer roller 45*b* is $1\times10^5$ to $1\times10^8\Omega$ (as measured in N/N (23° C./50% RH) environment under application of 2 kV).

In parallel to a forming operation of the toner image on the intermediary transfer belt 44*b*, the recording material S is conveyed (fed) from the feeding portion 2 toward the secondary transfer portion N2. The recording materials S are accommodated in a cassette 23*a* of the feeding portion 2 or are stacked on a manual feeding tray 23*b* of the feeding portion 2. The recording materials S accommodated in the cassette 23*a* and the recording materials S stacked on the manual feeding tray 23*b* are separated and fed one by one by feeding rollers 25*a* and 25*b*, respectively, or the like as feeding members of the feeding portion 2. The fed recording material S is conveyed along a conveying path by a conveying roller pair 26 and the like as a conveying member and reaches a registration roller pair 27 as a conveying member provided in the conveying path. Then, the recording material S is timed to the toner image on the intermediary transfer belt 44*b* by the registration roller pair 27, and is conveyed to the secondary transfer portion N2.

The recording material S onto which the toner image is transferred is conveyed to the fixing device 46 as a fixing means. The fixing device 46 includes a fixing roller 46*a* provided with a heating means and a pressing roller 46*b* press-contacted to the fixing roller 46*a*. The fixing device 46 nips and conveys the recording material S between the fixing roller 46*a* and the pressing roller 46*b*, and thus heats and presses the toner image on the recording material S, so that the toner image is fixed (melted, stuck) on the recording material S.

The recording material S on which the toner image is fixed is conveyed along a discharging path by a discharging roller pair 28 or the like of a discharging portion 3, so that the recording material S is discharged (outputted) onto a discharge tray 29 provided outside the apparatus main assembly 10 through a discharge opening of the discharging portion 3.

The surface of the photosensitive drum 51 after the primary transfer is electrically discharged by being irradiated with light by the pre-exposure device 54. Further, the toner (primary transfer residual toner) remaining on the photosensitive drum 51 after the primary transfer is removed and collected from the surface of the photosensitive drum 51 by the drum cleaning device 55. In this embodiment, the drum cleaning device 55 is of a counter blade type and includes a cleaning blade as a cleaning member provided in contact with the photosensitive drum 51. In this embodiment, the cleaning blade is an elastic blade formed of a material principally comprising a urethane rubber of 8 mm in free length and is contacted to the photosensitive drum 51 with a predetermined pressing force. The drum cleaning device 55 scrapes off the primary transfer residual toner from the surface of the rotating photosensitive drum 51 by the cleaning blade and accommodates the primary transfer residual toner in a cleaning container (not shown). Further, on an outer peripheral surface side of the intermediary transfer belt 44*b*, in a position opposing the driving roller 44*a*, a belt cleaning device 48 as an intermediary transfer member cleaning means is provided. Toner (secondary transfer residual toner) remaining on the intermediary transfer belt 44*b* after the secondary transfer is removed and collected from the surface of the intermediary transfer belt 44*b* by the belt cleaning device 48. In this embodiment, the belt cleaning device 48 is of a counter blade type similar to that of the drum cleaning device 55.

Further, in this embodiment, on the outer peripheral surface side of the intermediary transfer belt 44*b*, an image density sensor (image density detecting means) 72 for detecting an image density of a patch image (reference toner image) for image density control is provided. The image density sensor 72 is disposed opposed to the surface of the intermediary transfer belt 44*b* on a side downstream of the most downstream primary transfer portion N1K and upstream of the secondary transfer portion N2 with respect to a rotational direction of the intermediary transfer belt 44*b*.

In this embodiment, the image forming unit 50 constitutes a toner image forming means for forming the toner image on the intermediary transfer belt 44*b* depending on the image information.

2. Control Constitution

Figure 2:
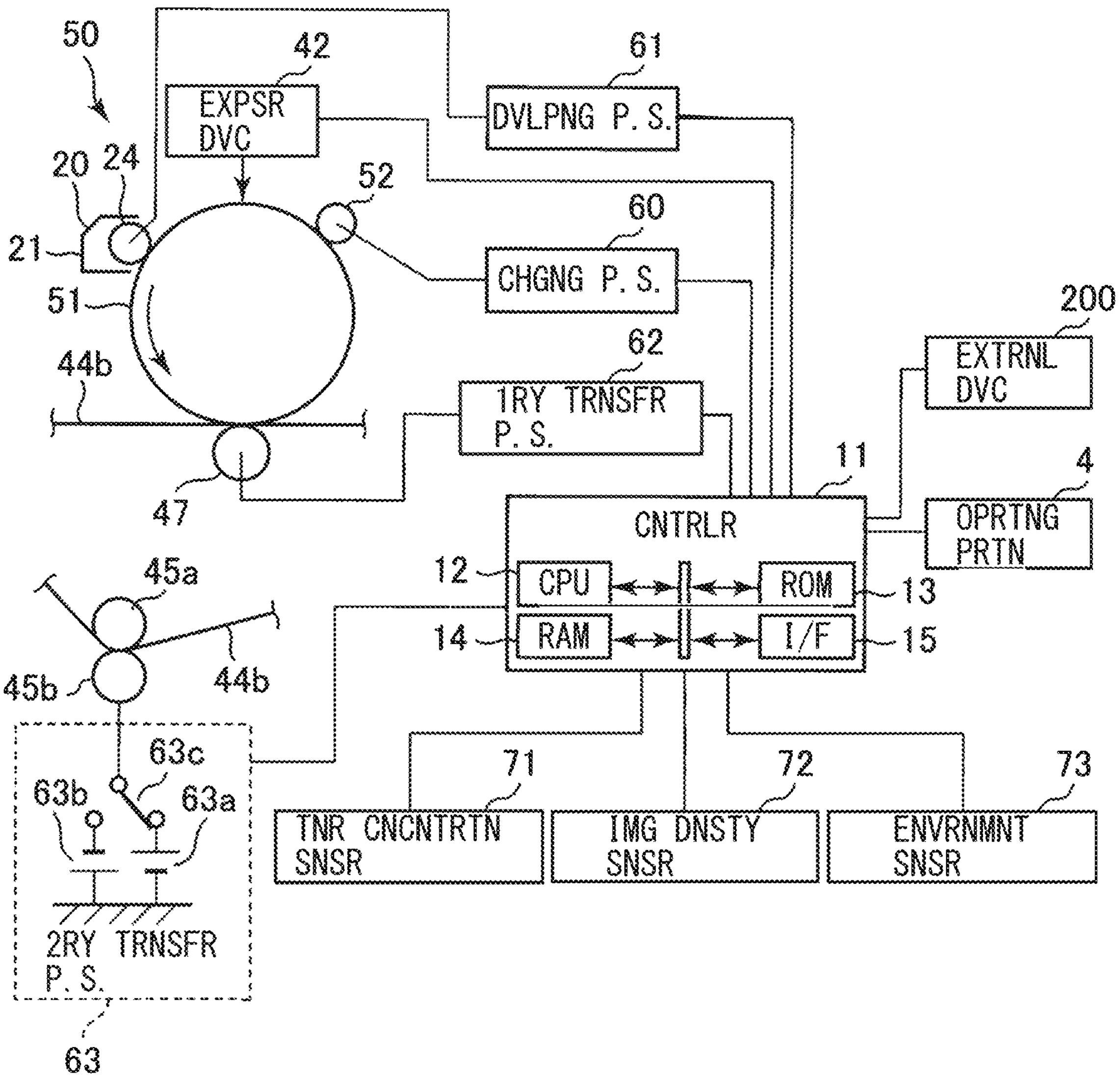
FIG. 2 is a schematic view showing a control constitution of the image forming apparatus.

FIG. 2 is a schematic block diagram showing a control constitution of the image forming apparatus 1 of this embodiment. The image forming apparatus 1 is provided with the controller 11 as a control means. The controller 11 is constituted by a computer and, for example, includes a CPU 12 as a calculating (computing) means, a ROM 13 and a RAM 14 which are storing means, and an input/output circuit (I/F) 15 for inputting/outputting signals to/from external devices for the controller 11. The CPU 12 is a microprocessor for managing overall control of the image forming apparatus 1 and is a main body of a system controller. The CPU 12 is connected to respective portions of the feeding portion 2, the image forming portion 40 (driving sources, power sources, exposure device, and the like), the discharging portion 3, the operating portion 4, the image reading apparatus 5, and the like via the input/output circuit 15, and not only transfers signals between itself and each portion but also controls an operation of each portion. The ROM (including a rewritable non-volatile memory) 13 stores programs, various data tables, various pieces of setting information, and the like which are for controlling the respective portions of the image forming apparatus 1. In the ROM 13, an image formation control sequence for forming the image on the recording material S, and the like are stored. Further, in the ROM 13, for example, a secondary transfer high-voltage table for determining the secondary transfer current or the secondary transfer voltage on the basis of environmental information is stored. The RAM 14 temporarily stores data and a calculation result on the control and a detection result of various sensors.

To the controller 11, for example, the charging power source 60, the developing power source 61, the primary transfer power source 62, a toner concentration sensor 71 as a toner concentration detecting means, an image density sensor 72 as an image density detecting means, and an environment sensor (temperature/humidity sensor) 73 as an environment detecting means are connected. Signals indicating the detection result (information) by the respective sensors are inputted to the controller 11. In this embodiment, the charging power source 60, the developing power source 61, the primary transfer power source 62, and the toner concentration sensor 71 are provided independently for each of the colors. The controller 11 controls a supply amount of the toner from the toner bottle 41 to the developing device 20 on the basis of a relationship between a toner concentration detected by the toner concentration sensor 71 and a target toner concentration. Further, the controller 11 sets the target toner concentration on the basis of an image density detected by the image density sensor 72. Further, the controller 11 sets a transfer condition in at least one of the primary transfer portion and the secondary transfer portion on the basis of the toner concentration detected by the toner concentration sensor 71, the image density detected by the image density sensor 72, and the environment information detected by the environment sensor 73.

The operator inputs job information to the controller 11 by operating the operating portion 4 provided on the image forming apparatus 1 and thus is capable of causing the image forming apparatus 1 to execute a job (described later). The operating portion 4 includes an inputting portion constituted by operating buttons or the like as an inputting means and a displaying portion constituted by a liquid crystal panel or the like as a display means. In this embodiment, the operating portion 4 is constituted by including a touch panel provided with a function of the inputting portion and a function of the displaying portion. Further, the operator inputs the job information to the controller 11 by an operation in the external device 200 such as a personal computer connected to the image forming apparatus 1, and thus is capable of causing the image forming apparatus 1 to execute the job. Job information (job signal) includes an instruction signal for designating an operation setting of the image forming apparatus 1, such as a job start signal, image information (image signal, image data), information on a kind of the recording material S used in the image formation, and the like.

Here, the image forming apparatus 1 executes the job (print job), which is a series of operations to form and output an image or images on a single or a plurality of recording materials S started by one start instruction. The job includes an image forming step, a pre-rotation step, a sheet (paper) interval step in the case where the images are formed on the plurality of recording materials S, and a post-rotation step in general. The image forming step is a period in which formation of an electrostatic image for the image to be actually formed and outputted on the recording material S, formation of the toner image, primary transfer of the toner image and secondary transfer of the toner image are carried out, and during image formation (image forming period) refers to this period. Specifically, a timing during the image formation is different among positions where the respective steps of the formation of the electrostatic image, the toner image formation, the primary transfer of the toner image and the secondary transfer of the toner image are performed. The pre-rotation step is a period in which a preparatory operation, before the image forming step, from an input of the start instruction until the image is started to be actually formed, is carried out. The sheet interval step (recording material interval step, image interval step) is a period corresponding to an interval between a recording material S and a subsequent recording material S when the images are continuously formed on a plurality of recording materials S (continuous printing, continuous image formation). The post-rotation step is a period in which a post-operation (preparatory operation) after the image forming step is performed. During non-image formation (non-image formation period) is a period other than the period of the image formation (during image formation) and includes the periods of the pre-rotation step, the sheet interval step, the post-rotation step and further includes a period of a pre-multi-rotation step, which is a preparatory operation during turning-on of a main switch (power source) of the image forming apparatus 1 or during restoration from a sleep state.

Further, the kind of the recording material S embraces arbitrary information capable of discriminating the recording material S, attributes (so-called a paper kind category) based on general features such as plain paper, non-coated paper, coated paper, an OHP film, and an envelope, and a manufacturer, a brand, a product number, and the like. In this embodiment, information on the kind of the recording material S included in the job information includes at least information (paper kind category) indicating whether or not the recording material S used in the image formation is the envelope.

3. Transfer member cleaning operation

In the image forming apparatus 1 of this embodiment, when there is no recording material S in the secondary transfer portion N2, a state in which the outer secondary transfer roller **45*b* directly contacts the intermediary transfer belt 44*b* is formed. For that reason, for example, in the case where the recording material S is not conveyed to the secondary transfer portion N2 due to an occurrence of the jam (paper jam), the surface of the outer secondary transfer roller 45*b* is contaminated with the toner of the toner image on the intermediary transfer belt 44*b* in some instances. A state in which the intermediary transfer belt 44*b* and the outer secondary transfer roller 45*b* are in direct contact with each other is formed also during pre-rotation before the image formation, during post-rotation after the image formation, in a region corresponding to the interval between the recording material S and the subsequent recording material S in the case where the continuous printing is carried out, and the like. For that reason, when the toner remains on the intermediary transfer belt 44*b* in these periods, the surface of the outer secondary transfer roller 45*b*** is contaminated with this toner in some cases.

The image forming apparatus 1 of this embodiment is constituted so as to be capable of executing a transfer member cleaning operation for cleaning the outer secondary transfer roller **45*b* in order to remove the contaminant on the surface of the outer secondary transfer roller 45*b* as described above. In this embodiment, the image forming apparatus 1 executes the transfer member cleaning operation such that a negative cleaning voltage (cleaning bias) and a positive cleaning voltage (cleaning bias) are alternately applied to the outer secondary transfer roller 45*b* during non-transfer in which there is no recording material S in the secondary transfer portion N2**.

As shown in FIG. 2, in this embodiment, the secondary transfer power source 63 includes a positive power source portion 63*a*, a negative power source portion 63*b*, and a switching portion (switch) 63*c* for connecting the positive power source portion 63*a* and the negative power source portion 63*b* to the outer secondary transfer roller 45*b* in a switching manner. The secondary transfer power source 63 switches the switching portion 63*c* on the basis of an instruction from the controller 11, so that the secondary transfer power source 63 is capable of selectively applying the voltage from the positive power source portion 63*a* or the voltage from the negative power source portion 63*b* to the outer secondary transfer roller 45*b*.

By applying the negative cleaning voltage, i.e., a voltage of the opposite polarity to the polarity of the voltage during the transfer, to the outer secondary transfer roller 45*b*, the toner of the negative polarity (normal charge polarity) deposited on the outer secondary transfer roller 45*b* can be moved to the intermediary transfer belt 44*b*. Further, in the toner deposited on the outer secondary transfer roller 45*b*, toner charged to the opposite polarity to the normal charge polarity of the toner (or toner with no sufficient electric charge) is contained in some instances. For that reason, by applying the positive cleaning voltage, i.e., the voltage of the same polarity as the polarity of the voltage during the transfer, to the outer secondary transfer roller 45*b*, the toner of the positive polarity (opposite polarity to the normal charge polarity) deposited on the outer secondary transfer roller 45*b* can be moved to the intermediary transfer belt 44*b*. By this, cleaning of the outer secondary transfer roller 45*b* can be performed. The toner moved from the outer secondary transfer roller 45*b* to the intermediary transfer belt 44*b* is collected by the belt cleaning device 48.

In this embodiment, the controller 11 carries out control so that the transfer member cleaning operation is executed in the post-rotation step after the image formation of the job is ended. Further, in this embodiment, a test image for image control (such as density control) is formed on the intermediary transfer belt 44*b* in the sheet interval step during the continuous printing in some instances. In that case, the controller 11 carries out control so that the transfer member cleaning operation is executed after the test image formed on the intermediary transfer belt 44*b* passes through the secondary transfer portion N2 and before the subsequent recording material S reaches the secondary transfer portion N2. Further, in this embodiment, the controller 11 carries out control so that the transfer member cleaning operation is executed in the pre-rotation step (or the pre-multi-rotation step) before the image formation of the job after jam tolerance is started. Further, in this embodiment, in the case where the recording material S used in the image formation is the envelope, the controller 11 carries out control so that the transfer member cleaning operation is executed at a predetermined timing. The transfer member cleaning operation in the case where the recording material S used in the image formation is the envelope will be described specifically later.

Here, in this embodiment, in the transfer member cleaning operation, each of the negative cleaning voltage and the positive cleaning voltage are applied to the outer secondary transfer roller 45*b* which is a rotatable member during a period in which the outer secondary transfer roller 45*b* rotates through one-full cleaning. By this, each of the negative toner and the positive toner which are deposited on the outer secondary transfer roller 45*b* can be efficiently moved to the intermediary transfer belt 44*b*. At least one of the negative cleaning voltage and the positive cleaning voltage may be applied to the outer secondary transfer roller 45*b* for a period of not less than a time in which the outer secondary transfer roller 45*b* rotates through one-full circumference. Further, in this embodiment, in the transfer member cleaning operation, each of the negative voltage and the positive voltage is applied once to the outer secondary transfer roller 45*b*, but at least one of the negative voltage and the positive voltage may be applied plural times to the outer secondary transfer roller 45*b*. Further, an order of application of the negative cleaning voltage and the positive cleaning voltage to the outer secondary transfer roller 45*b* is not particularly limited, but may be arbitrary switched. For example, the number of times of application and the order of application such that the negative voltage, the positive voltage, the negative voltage, and the positive voltage are applied may be employed. Further, each of the negative cleaning voltage and the positive cleaning voltage may be subjected to constant-current control or constant-voltage control. Incidentally, the constant-current control is control such that an output of the power source is adjusted so that a current supplied to a supply object is substantially constant at a target current. Further, the constant-voltage control is control such that the output of the power source is adjusted so that a voltage applied to an application object is substantially constant at a target voltage. A target current value or a target voltage value of each of the negative cleaning voltage and the positive cleaning voltage can appropriately be set so as to provide a sufficient cleaning performance, and typically, these values are the same as those during the transfer, but may be made larger or smaller than those during the transfer.

4. Sheet Setting

In this embodiment, the image forming apparatus 1 includes a recording material information acquiring portion for acquiring information on a kind of the recording material S. In this embodiment, for example, the operating portion 4 provided on the image forming apparatus 1 functions as the recording material information acquiring portion. The controller 11 not only controls the operating portion 4 to display a predetermined screen but also acquires information of various settings including information on the kind of the recording material S depending on an operation in the screen by the operator. The controller 11 causes the RAM 14 (or the non-volatile memory) to store the information of the various settings such as the information on the kind of the recording material S. Further, the controller 11 is capable of setting a predetermined image forming condition (transfer condition or fixing condition) stored in the ROM 13. Input of information on the kind of the recording material S used in the image formation (herein, also referred to as a "sheet setting") is made before the job is started.

FIG. 3 is a schematic view showing an example of a screen displayed on the operating portion 4 in this embodiment. For example, an operator such as a user or a service engineer selects (operates) the setting button 401 on a function selection screen 402 as shown in part (a) of FIG. 3 displayed on the display screen 400 of the operating portion 4 as a user interface. By this, a setting item selection screen 403 enabling various settings as shown in part (b) of FIG. 3 is displayed on the operating portion 4. Further, the operator selects (operates) a sheet setting button 404 on the setting item selection screen 403. By this, a sheet setting screen 405 enabling selection of the kind of the recording material S (so-called "sheet (paper) kind category") and a basis weight (mass) used in image formation as shown in part (c) of FIG. 3 is displayed on the operating portion 4. In the sheet setting screen 405, a sheet selection portion 406 can select and set, as the kind of the recording material S, for example, non-coated paper, coated paper, metallized paper, an envelope, and the like. Further, depending on the kind of the recording material S selected in the sheet selection portion 406, in a basis weight selection portion 407, it becomes possible to set, as the basis weight, for example, 64 ~ 80 g/m$^2$, . . . , for non-coated paper, 106 ~128 g/m$^2$, 129 ~150 g/m$^2$, 151 ~176 g/m$^2$, . . . , for coated paper, and 106 ~128 g/m$^2$, 129 ~150 g/m$^2$, 151 ~176 g/m$^2$, . . . , for metallized paper, by selecting (inputting) these values. Part (c) of FIG. 3 shows the case where the coated paper is selected in the sheet selection portion 406.

Further, when the operator selects the envelope in the sheet selecting screen 406, as shown in part (a) of FIG. 4, an envelope size selecting portion 408 enabling selection of a size of the envelope is displayed on the sheet setting screen 405. The operator designates the size of the envelope in the envelope size selecting portion 408 in the case where the recording material S used in the image formation is the envelope. As the size of the envelope, it becomes possible to select and set, for example, a size of standard-size envelope such as Chou No. 3, You Chou No. 3, or You No. 3. In addition, it may also become possible to select and set a commercially available non-standard-size envelope such as Kaku No. 1 or Kaku No. 2. Incidentally, the envelope of Chou No. 3, Chou No. 4, Kaku No. 1, Kaku No. 2 or the like is provided with an enclosing port and a flap on a short side thereof. Further, the envelope of You No. 3, You No. 4, or the like is provided with an enclosing port and a flap on a long side thereof. Further, the size of the envelope is standardized as a size in a state in which the flap is closed. A length of the flap (length in a direction substantially perpendicular to the side where the flap is provided) and a shape of the flap (shape or the like of a cut-away portion on opposite ends of the flap with respect to a longitudinal direction) vary depending on commodity products of the envelope.

The image forming apparatus 1 of this embodiment is capable of forming an image also on the flap of the envelope (it is possible to form the image on the flap of the envelope opened). When the operator selects (operates) a flap setting button 409 displayed on the sheet setting screen 405 as shown in part (a) of FIG. 4, a flap length setting screen 410 enabling a setting of a length of the flap is displayed on the operating portion 4 as shown in part (b) of FIG. 4. In the flap length setting screen 410, the operator is capable of inputting and setting the length of the flap of the envelope used in the image formation, to a flap length inputting portion 411. In the case where the recording material S used in the image formation is the envelope, the image forming apparatus 1 is capable of forming an image (toner image) in an image forming region including a flap-excluded portion (width (W1)×top to bottom length (L1) in a state in which the flap is closed: see FIG. 5) and a flap portion (width (W1)×flap length (L2)). In advance, it may also be that the image (toner image) can be formed in an image forming region of a width×a length based on the develop size of the standardized envelope and a length of an ordinary flap.

In the case where the operator sends job information from the external device 200 such as the personal computer to the controller 11 of the image forming apparatus 1 and then the job is executed by the image forming apparatus 1, various settings similar to the above-described various settings can also be made possible in the external device 200. In this case, the CPU 12 functioning as the recording material information acquiring portion acquires information on the kind of the recording material S from the external device 200 to the controller 11. Further, in this case, the operator operates a user interface displayed on the displaying portion (display) of the external device 200 in accordance with a printer driver program installed in the external device 200. By this, the operator is capable of providing an instruction to send the information on the kind of the recording material S to the controller 11 of the image forming apparatus 1.

5. Flap Printing

As shown in FIG. 5, the envelope is provided with a main body portion E for accommodating contents (enclosure) and a flap (lid) F for closing the enclosing port provided on one side of the main body portion E. Then, in some instances, it is required that for example, a toner image formed on the basis of image data outputted from the personal computer is transferred onto a region including the flap of the envelope (herein, also referred to as "flap printing"). However, the shape of the flap, particularly, the shape of the cut-away portion includes various shapes. For that reason, as shown in FIG. 6, there is a possibility that the toner image formed on the intermediary transfer belt **44*b* is protruded from the flap in the secondary transfer portion N2**.

Thus, when the flap printing is executed, in the case where the toner image is protruded from the flap in the secondary transfer portion N2, the protruded toner image is deposited on the surface of the outer secondary transfer roller **45*b*, so that the surface of the outer secondary transfer roller 45*b* is contaminated with the toner. Then, as shown in FIG. 6, in the case where the continuous printing is carried out, there is a possibility that the toner deposited on the surface of the outer secondary transfer roller 45*b* is deposited on the back surface (surface opposite from the surface on which the toner image is transferred in the secondary transfer portion N2**) of a subsequent recording material S (for example, the envelope), and thus back contamination of the recording material S with the deposited toner occurs.

In the case where the image is formed on at least a standardized-size envelope (particularly, a regular-size envelope), the image forming apparatus 1 of this embodiment is set so that a setting of the envelope to the feeding portion 2 (manual feeding tray **23*b* or cassette 23*a*) and conveyance (feeding) of the envelope are carried out in a state in which opposite short sides of the envelope become a leading end and a trailing end with respect to a conveying direction (feeding direction) of the recording material S. Particularly, in the case of an envelope provided with the flap on a short side (see FIG. 5), a setting is made in a manner such that the setting of the envelope to the feeding portion 2 (manual feeding tray 23*b* or cassette 23*a*) and the conveyance of the envelope are carried out so that the flap of the envelope is positioned at the trailing end of the envelope (recording material S) with respect to the conveying direction. For example, the controller 11 is capable of notifying the operator of information prompting the setting of the envelope to the feeding portion 2 so as to provide the above-described direction by controlling the operating portion 4 as a notifying portion for notifying the information to the operator so as to display the information. Further, the controller 11 is also capable of controlling the display portion of the external device 200 to display information similar to the above-described information via the input/output circuit 15** functioning as the notifying portion. Further, in the case of the envelope provided with the flap on the short side, image formation can be carried out not only in a state in which the flap is open but also in a state in which the flap is closed. On the other hand, in the case of an envelope provided with a flap on a long side, a setting is made so that the image formation is carried out in a state in which the flap is closed. The conveying direction of such an envelope is set in view of a conveying property of the envelope used.

In this embodiment, on the basis of the operation by the operator, the information on the kind of the recording material S is acquired, but for example, a sensor for detecting the kind of the recording material S is provided to the feeding portion 2 or in a conveying (feeding) path and then the information on the kind of the recording material S may also be automatically acquired on the basis of a detection result of the sensor.

6. Transfer Member Cleaning Operation in Case that Envelope is Used

In order to suppress the above-described back contamination in the case where the recording material S used in the image formation is the envelope, it is desired that the toner protruded from the flap and deposited on the surface of the outer secondary transfer roller 45*b* is removed by executing the transfer member cleaning operation.

In this embodiment, in the case where the recording material S used in the image formation is the envelope, there is a possibility that transfer of the toner image onto the flap is performed, and thus there is a possibility that the toner protruded from the flap is deposited on the surface of the outer secondary transfer roller 45*b*. Further, in this embodiment, with every passing of the envelope through the secondary transfer portion N2, the transfer member cleaning operation is executed after the envelope passes through the secondary transfer portion N2 and before recording material S reaches the secondary transfer portion N2. For example, in the case of continuous printing in which images are continuously formed on envelopes, with every passing of one envelope through the secondary transfer portion N2, the transfer member cleaning operation is executed in a sheet interval step which is during non-transfer before a subsequent envelope reaches the secondary transfer portion N2.

FIG. 7 is a flow chart showing an outline of a procedure of a job in this embodiment. In this case, description will be made on the assumption that the kind of the recording materials S used in one job is the same. An image (image data) transferred onto a single recording material S is counted as a "1 (one) Image".

First, when the operator makes a sheet setting in the operating portion 4 (or the external device 200), the controller 11 (the CPU 12) acquires the information on the kind of the recording material S (S100). Then, the controller 11 discriminates whether or not the recording material S used in the image formation is the envelope (S101). In the case where the controller 11 discriminated in S101 that the recording material S is the envelope, the controller 11 starts the job (S102), and after transfer of the 1 Image onto the recording material S is ended (S103), the controller 11 executes the transfer member cleaning operation (S104). Thereafter, the controller 11 discriminates whether or not a residual (remaining) Image in the job is 0 (zero) Image (no image) (S105). In the case where the controller 11 discriminated in S105 that the residual Image is larger than the 0 Image (the residual Image is not the 0 Image), the procedure returns to the process of S103, and the processes S103 to S105 are repeated until the residual Image becomes the 0 Image. In the case where the controller 11 discriminated in S105 that the residual Image is the 0 Image, the controller 11 ends the job (S106), and ends the control.

Further, in the case where the controller 11 discriminated in S101 that the recording material S is not the envelope, the controller 11 starts the job (S107), and after transfer of all images (Images) on the recording materials S in the job is completed (S108), the controller 11 executes the transfer member cleaning operation (S109). Thereafter, the controller 11 ends the job (S106), and ends the control.

That is, in the case where the controller 11 discriminated in S101 that the recording material S is not the envelope, the transfer member cleaning operation is not executed in a period from passing of the recording material S through the secondary transfer portion N until the subsequent recording material S reaches the transfer portion (so-called sheet interval). That is, similarly as in the case of the plain paper, a bias applied during the normal sheet interval without increasing the sheet interval (herein, this bias is also referred to as a sheet interval bias) is applied. The sheet interval bias applied in this embodiment is set as follows. That is, a bias (bias of the same polarity as the normal charge polarity of the toner) opposite to the polarity of the bias applied during the transfer is applied to the outer secondary transfer roller 45*b* so that fog toner is not deposited on the outer secondary transfer roller 45*b*. Specifically, a relatively small bias of the negative polarity is subjected to the constant-current control (−1 μA). In this embodiment, the constant-current control is carried out, but the constant-voltage control may also be carried out.

Incidentally, in FIG. 7, the kind of the recording material S used in the single job was the same, but even in a job (mixed job) in which a plurality of kinds of recording materials S are used, similarly as described above, the transfer member cleaning operation may only be required to be executed every passing of the envelope through the secondary transfer portion N2.

7. Effect confirmation

The envelope was fed in a state in which the flap was opened with use of the envelope (for example, the Chou No. 3) as the recording material S, and the continuous printing in which the flap printing was executed was carried out, so that a degree of the back contamination with the toner protruded from the flap and deposited on the outer secondary transfer roller 45*b* was checked. In order to confirm an effect of this embodiment, the test image was set so as to be protruded from the flap with reliability. The back contamination was evaluated using a density measuring device ("DENSITOMETER TC-6MC-D", manufactured by TOKYO DENSHOKU CO., LTD.). That is, density measurement in a region of the flap contacting a portion of the outer secondary transfer roller 45*b* contacted the toner image protruded from the flap and density measurement in a region other than the above-described region at the same surface were made, and an absolute value of a difference between measured densities was acquired. In the case where the acquired value is 1.0 or less, it means that the back contamination does not occur. Comparison of the back contamination between the case where the transfer member cleaning operation is executed every 1 Image in accordance with this embodiment and the case where the transfer member cleaning operation is not executed as a comparison example was made. A result is shown in a Table 1 appearing hereinafter. In the transfer member cleaning operation, a negative cleaning voltage subjected to the constant-current control and a positive cleaning voltage subjected to the constant-current control were applied once in a named order to the outer secondary transfer roller 45*b* for a time corresponding to one-full circumference to the outer secondary transfer roller 45*b*. A target current of the negative cleaning voltage was-25 μA, and a target current of the positive cleaning voltage was +100 μA.

TABLE 1

| CONDITION | VALUE*1 | BC*2 |
|---|---|---|
| CLEANING OPERATION*3 | 0.4 | NOT OCCURRED |
| NO CLEANING OPERATION*4 | 1.3 | OCCURRED |

*1"VALUE" is the measured value.
*2"BC" is the back contamination.
*3"CLEANING OPERATION" means the case where the transfer member cleaning operation is performed every 1 Image.
*4"NO CLEANING OPERATION" means the case where the transfer 1 member cleaning operation is not performed every 1 Image.

As shown in the Table 1, in this embodiment, by executing the transfer member cleaning operation every 1 Image, the back contamination of the subsequent recording material S can be suppressed. On the other hand, in the comparison example, the back contamination possibly causing a problem on a second recording material S and later occurred.

Thus, in this embodiment, the image forming apparatus 1 includes the image bearing member (intermediary transfer belt) 44*b*, the toner image forming means (image forming unit) 50 for forming the toner image on the image bearing member 44*b* depending on the image information, the transfer member (outer secondary transfer roller) 45*b* which forms the transfer portion (secondary transfer portion) N2 between itself and the image bearing member 44*b* in contact with the image bearing member 44*b* and which is for transferring the toner image from the image bearing member 44*b* onto the recording material S passing through the transfer portion N2, the applying portion (secondary transfer power source) 63 for applying the voltage for transferring the toner image from the image bearing member 44*b* onto the recording material S passing through the transfer portion N2, the recording material information acquiring portion (operating portion) 4 for acquiring the recording material information on the kind of the recording material S, and the controller 11 capable of controlling the applying portion 63. In the continuous printing in which the toner images are continuously transferred onto the first recording material S and the second recording material S, in the case where the first recording material S in the envelope on the basis of the above-described recording material information, the controller 11 carries out control so that the transfer member cleaning operation in which the voltage of the same polarity as the normal charge polarity of the toner and the voltage of the opposite polarity to the normal charge polarity are alternately applied by the applying portion 63 is executed after the first recording material S passes through the transfer portion N2 and before the second recording material S reaches the transfer portion N2. In this embodiment, the image forming apparatus 1 includes the feeding portion 2 for feeding the recording material S toward the transfer portion N2 and the notifying portion (operating portion) 4 for notifying the operator of the information. In the case where as the recording material S, the envelope provided with the flap on the short side, the controller 11 is capable of controlling the notifying portion 4 so as to notify the information prompting that the recording material S is set so that the flap of the envelope is on the trailing end side of the recording material S with respect to the conveying direction.

As described above, according to this embodiment, in the case where the image is formed on the flap of the envelope, it is possible to suppress that the subsequent recording material S is contaminated with the toner protruded from the flap of the envelope and deposited on the outer secondary transfer roller 45*b*.

Embodiment 2

Next, another embodiment of the present invention will be described. The basic structure and operation of an image forming apparatus of this embodiment are the same as those of the image forming apparatus of the embodiment 1. Therefore, in the image forming apparatus of this embodiment, elements having the same or corresponding functions or structures as those of the image forming apparatus of the embodiment 1 are denoted by the same reference numerals or symbols as those of the embodiment 1, and detailed description thereof will be omitted.

1. Outline of this Embodiment

In the embodiment 1, the transfer member cleaning operation was executed every passing of the envelope through the secondary transfer portion N2 on the assumption that there is a possibility of an occurrence of the back contamination due to the toner protruded from the flap in the case where the recording material S used in the image formation is the envelope. However, in order to obtain a sufficient cleaning effect, for example, a time corresponding to two-full circumferences (the case where each of cleaning voltages of both the positive polarity and the negative polarity is applied for a time corresponding to one-full circumference) or more of the outer secondary transfer roller 45*b* is needed. For that reason, for example, in the case where the transfer member cleaning operation is executed in the sheet interval step during the continuous printing, in order to provide a time thereof, an increase in sheet interval is needed in some instances, so that downtime (period in which the image cannot be formed) becomes long in some instances.

Here, even in the case where the recording material S used in the image formation is the envelope, when the flap printing is not executed, the toner protruded from the flap is not deposited on the surface of the outer secondary transfer roller 45*b*.

Therefore, in this embodiment, in the case where the recording material S used in the image formation is the envelope, information on whether or not the flap printing is executed (in this embodiment, this information is referred to as "flap printing information") is acquired. Further, if the flap printing is not executed, the transfer member cleaning operation is not executed every passing of the envelope through the secondary transfer portion N2, and is executed typically in the post-rotation step after the image formation of the job is ended.

Particularly, in this embodiment, as the flap printing information, information as to whether the flap is opened or closed (in this embodiment, this information is referred to as "flap open/close information") is used. Further, particularly, in this embodiment, as the flap open/close information, flap open/close information based on input by the operator (in this embodiment, this input is also referred to as a "flap open/close setting") is used. Further, in the case where the flap is closed, discrimination that the flap printing is not executed is made.

2. Flap Open/Close Setting

Part (a) of FIG. 8 is a schematic view showing an example of a screen displayed on the operating portion 4 in this embodiment. In this embodiment, when the operator selects (operates) a flap setting button 409 in the sheet setting screen 405 as shown in part (a) of FIG. 4 described in the embodiment 1, a flap open/close setting screen 412 enabling the flap open/close setting as shown in part (a) of FIG. 8 is displayed on the operating portion 4. The operator is capable of selecting and setting that the envelope is fed in a state in which the flap is open, by selecting (operating) a flap open button 413*a* in the flap open/close setting screen 412. Further, the operator is capable of selecting and setting that the envelope is fed in a state in which the envelope is closed, by selecting (operating) a flap close button 413*b* in the flap open/close setting screen 412.

In the case where the operator selects (operates) the flap open button 413*a*, the flap length setting screen 410 as shown in part (b) of FIG. 4 can be made displayed on the operating portion 4. Further, the length of the flap is set by the flap length setting screen 410 as shown in part (b) of FIG. 4, the flap open/close setting screen 412 may be made displayed on the operating portion 4. Further, as described above, in the case where the image can be formed in a region including a flap with a predetermined length, only the flap open/close setting screen 412 as shown in part (a) of FIG. 8 may be made displayed.

Further, as described in the embodiment 1, a setting similar to the above-described setting may be made in the external device 200.

2. Transfer Member Cleaning Operation in Case that Envelope is Used

FIG. 9 is a flow chart showing an outline of a procedure of a job in this embodiment. In this case, description will be made on the assumption that the kind of the recording materials S used in one job is the same.

First, when the operator makes a sheet setting in the operating portion 4 (or the external device 200), the controller 11 (the CPU 12) acquires the information on the kind of the recording material S (S200). Then, the controller 11 discriminates whether or not the recording material S used in the image formation is the envelope (S201). Further, in the case where the recording material S used in the image formation is the envelope, when the operator makes the flap open/close setting on the operating portion 4 (or the external device 200), the controller 11 acquires the flap open/close information (S202). Then, the controller 11 discriminates whether or not the flap is open (S203). In the case where the controller 11 discriminated in S203 that the flap is open, the controller 11 starts the job (S204), and after transfer of the 1 Image onto the recording material S is ended (S205), the controller 11 executes the transfer member cleaning operation (S206). Thereafter, the controller 11 discriminates whether or not a residual (remaining) Image in the job is 0 (zero) Image (no image) (S207). In the case where the controller 11 discriminated in S207 that the residual Image is larger than the 0 Image (the residual Image is not the 0 Image), the procedure returns to the process of S205, and the processes S205 to S207 are repeated until the residual Image becomes the 0 Image. In the case where the controller 11 discriminated in S207 that the residual Image is the 0 Image, the controller 11 ends the job (S208), and ends the control.

Further, in the case where the controller 11 discriminated in S201 that the recording material S is not the envelope or in the case where the controller 11 discriminated in S203 that the flap is not open, the controller 11 starts the job (S209), and after transfer of all Images on the recording materials S in the job is completed (S210), the controller 11 executes the transfer member cleaning operation (S211). Thereafter, the controller 11 ends the job (S208), and ends the control.

Incidentally, in FIG. 9, the kind of the recording material S used in the single job was the same, but even in a job in which a plurality of kinds of recording materials S are used, similarly as described above, the transfer member cleaning operation may only be required to be executed every passing of the envelope, fed in a state in which the flap is open, through the secondary transfer portion N2.

In this embodiment, when effect confirmation similar to the effect confirmation in the embodiment 1 is made, even in the case where the flap printing is executed by feeding the envelope in the state in which the flap is open, the back contamination of the subsequent recording material S was capable of being suppressed.

Further, in the case where the flap printing in which the envelope is fed in a state in which the flap is closed is not executed, the back contamination of the subsequent recording material S did not occur even when the transfer member cleaning operation is not executed. Further, in this case, the transfer member cleaning operation is not executed in the sheet interval step, so that a time from a start of the job to an end of the job can be shortened.

In this embodiment, as the flap printing information, the information (flap open/close information) whether the flap is open or closed was used, but is not limited thereto. For example, execution or non-execution of an operation in a flap printing mode (mode in which the image is formed in a region in which the flap is open) in which the flap printing is executed may also be made settable from the operating portion 4. In this case, ON/OFF setting information of the operation in the flap printing mode is the flap printing information. In the case where the operation in the flap printing mode is selected (flap printing mode: ON) on the basis of the ON/OFF setting information in the operation in the flap printing mode, the controller 11 (CPU 12) acquires image information of the image formed on the main body portion E and the flap portion F, and then carries out the flap printing. Then, the controller 11 is capable of executing the transfer member cleaning operation in the sheet interval step every printing of the image on the envelope. On the other hand, in the case where the operation in the flap printing mode is not selected (flap printing mode: OFF), the controller 11 is capable of executing the transfer member cleaning operation after transfer of all the images (Images) onto the recording material S in the job. Part (b) of FIG. 8 is a schematic view showing an example of a screen displayed on the operating portion 4 in this case. For example, when the operator selects (operates) the flap setting button 409 in the sheet setting screen 405 as shown in part (a) of FIG. 4, a flap printing mode setting screen 414 enabling the ON/OFF setting in the operation in the flap printing mode shown in part (b) of FIG. 8 is displayed on the operating portion 4. The operator is capable of selecting and setting the ON of the operation in the flap printing mode by selecting (operating) a flap printing mode ON button 415*a* in the flap printing mode setting screen 414. Further, the operator is capable of selecting and setting the OFF of the operation in the flap printing mode by selecting (operating) a flap printing mode OFF button 415*b* in the flap printing mode setting screen 414. Incidentally, setting similar to the above-described setting may also be made in the external device 200.

Further, in the case where the operation in the flap printing mode is selected, the controller 11 may carry out control so that information prompting the operator to set the envelope in the feeding portion 2 in a state in which the flap of the envelope becomes a trailing end with respect to the conveying direction of the recording material S is displayed on the operating portion 4. Further, in the case where the operation in the flap printing mode is set, the controller 11 may have a constitution in which setting of the envelope in a state in which the flap is positioned on one side of the envelope crossing the conveying direction of the recording material S is not permitted. For example, in the case where the envelope is set in such a manner, it is possible not to permit the controller 11 to execute the job. By doing so, it is possible to suppress that the toner image protruded from the flap is deposited on a flap of a subsequent envelope. Further, in the case where the operation in the flap printing mode is not set, the controller 11 may have a constitution in which setting of the envelope in a state in which the flap is on a side other than the trailing end with respect to the conveying direction of the recording material S is permitted.

Thus, in this embodiment, the image forming apparatus 1 includes a flap printing information acquiring portion for acquiring the flap printing information on whether or not the flap printing for transferring the toner image onto the flap of the envelope. In the case where the first recording material S in the continuous printing is the envelope on the basis of the above-described recording material information on the kind of the recording material S and in the case where the flap printing of the image on the first recording material S is executed on the basis of the above-described flap printing information, the controller 11 carries out control so as to execute the transfer member cleaning operation in which the voltage of the same polarity as the normal charge polarity of the toner and the voltage of the opposite polarity to the normal charge polarity are alternately applied by the applying portion 63 after the first recording material S passed through the transfer portion N2 and before the second recording material S in continuous printing reaches the transfer portion N2. In this embodiment, the flap printing information acquiring portion (operating portion) 4 acquires the flap open/close information on an open/close state of the flap of the envelope, as the flap printing information. In the case where the first recording material S is the envelope on the basis of the above-described recording material information, when the flap of the first recording material S is open on the basis of the above-described flap open/close information, the controller 11 carries out control so as to execute the transfer member cleaning operation after the first recording material S passes through the transfer portion N2 and before the second recording material S reaches the transfer portion N2, and when the flap of the first recording material S is closed, the controller 11 carries out control so that the second recording material S reaches the transfer portion N2 without executing the transfer member cleaning operation after the first recording material S passes through the transfer portion N2. In this embodiment, the flap printing information acquiring portion 4 acquires the flap open/close information on the basis of the operation by the operator. Further, in this embodiment, the image forming apparatus 1 includes the feeding portion 2 for feeding the recording material S toward the transfer portion N2 and the notifying portion (operating portion) 4 for notifying the operator of the information. In the case where the flap printing is executed on the basis of the flap printing, the controller 11 is capable of controlling the notifying portion 4 so as to notify the information prompting that the envelope is set in the feeding portion 2 so that the flap of the envelope is on the trailing end side of the envelope with respect to the conveying direction of the recording material S. Further, the image forming apparatus 1 may be capable of selectively executing the operation in the flap printing mode in which the image is formed on a flap portion of the envelope of which flap is open, and the flap printing information acquiring portion 4 may be constituted so as to acquire, as the flap printing information, information on whether or not the operation in the flap printing mode is executed.

As described above, according to this embodiment, in the case where not only an effect similar to the effect of the embodiment 1 is obtained but also the flap printing is not executed, it is possible to suppress that downtime becomes long due to the transfer member cleaning operation.

Embodiment 3

Next, another embodiment of the present invention will be described. The basic structure and operation of an image forming apparatus of this embodiment are the same as those of the image forming apparatuses of the embodiments 1 and 2. Therefore, in the image forming apparatus of this embodiment, elements having the same or corresponding functions or structures as those of the image forming apparatuses of the embodiments 1 and 2 are denoted by the same reference numerals or symbols as those of the embodiment 1, and detailed description thereof will be omitted.

1. Outline of this Embodiment

In this embodiment, similarly as in the embodiment 2, in the case where the recording material S used in the image formation is the envelope, the flap printing information is acquired, and whether to execute the transfer member cleaning operation is discriminated. In the embodiment 2, in the case where the flap is open, the flap printing was executed by using the flap open/close information as the flap printing information. However, even in the case where the flap is open, when the flap printing is not executed, the toner protruded from the flap is not deposited on the surface of the outer secondary transfer roller 45*b*.

Therefore, in this embodiment, as the flap printing information, the flap open/close information and the image information are used. Further, in the case where the flap is closed or in the case where the flap is open but there is no image data (toner image) in a region corresponding to the flap, discrimination that the flap printing is not executed is made.

2. Image Information of Region Corresponding to Flap

In this embodiment, when the envelope is set as the recording material used in the image formation and setting of feeding of the envelope in a state in which the flap is open is made, the controller 11 performs comparison between a length of image data from, for example, the external device 200 in a conveying direction of the image data (surface movement direction of the photosensitive drum 51 and the intermediary transfer belt 44*b*) and a length of the recording material S (length of the recording material S excluding the flap in the case where the recording material S is the envelope) in a predetermined conveying direction of the recording material S. Then, as a result of the comparison thereof, in the case where the length of the image data is longer than the length of the recording material S, the controller 11 discriminates that the image data (toner image) exists in the region corresponding to the flap.

3. Transfer Member Cleaning Operation in Case that Envelope is Used

FIG. 10 is a flow chart showing an outline of a procedure of a job in this embodiment. In this case, description will be made on the assumption that the kind of the recording materials S used in one job is the same.

First, when the operator makes a sheet setting in the operating portion 4 (or the external device 200), the controller 11 (the CPU 12) acquires the information on the kind of the recording material S (S300). Then, the controller 11 discriminates whether or not the recording material S used in the image formation is the envelope (S301). Further, in the case where the recording material S used in the image formation is the envelope, when the operator makes the flap open/close setting on the operating portion 4 (or the external device 200), the controller 11 acquires the flap open/close information (S302). Then, the controller 11 discriminates whether or not the flap is open (S303). In the case where the controller 11 discriminated in S303 that the flap is open, the controller 11 acquires the image data (S304). Then, the controller 11 compares a length of the envelope in the conveying direction with a length of the acquired image data, and discriminates whether or not the image data (toner image) exists in the region corresponding to the flap (S305). In the case where the controller 11 discriminated in S305 that the image data exists in the region corresponding to the flap, the controller 11 starts the job (S306), and after transfer of the 1 Image onto the recording material S is ended (S307), the controller 11 executes the transfer member cleaning operation (S308). Thereafter, the controller 11 discriminates whether or not a residual (remaining) Image in the job is 0 (zero) Image (no image) (S309). In the case where the controller 11 discriminated in S309 that the residual Image is larger than the 0 Image (the residual Image is not the 0 Image), the procedure returns to the process of S307, and the processes S307 to S309 are repeated until the residual Image becomes the 0 Image. In the case where the controller 11 discriminated in S309 that the residual Image is the 0 Image, the controller 11 ends the job (S310), and ends the control.

Further, in the case where the controller 11 discriminated in S301 that the recording material S is not the envelope, in the case where the controller 11 discriminated in S303 that the flap is not open, or in the case where the controller 11 discriminated in S305 that the image data does not exist in the region corresponding to the flap, the controller 11 starts the job (S311), and after transfer of all Images on the recording materials S in the job is completed (S312), the controller 11 executes the transfer member cleaning operation (S313). Thereafter, the controller 11 ends the job (S310), and ends the control.

Incidentally, in FIG. 10, the kind of the recording material S used in the single job was the same, but even in a job in which a plurality of kinds of recording materials S are used, similarly as described above, the transfer member cleaning operation may only be required to be executed every passing of the envelope, fed in a state in which the flap is open, through the secondary transfer portion N2 in the case where the image data exists in the region corresponding to the flap.

In this embodiment, when effect confirmation similar to the effect confirmation in the embodiment 1 is made, even in the case where the flap printing is executed by feeding the envelope in the state in which the flap is open, the back contamination of the subsequent recording material S was capable of being suppressed.

Further, in the case where the flap printing in which the envelope is fed in a state in which the flap is closed is not executed, or in the case where the flap printing in which the envelope is fed in a state in which the flap is open is not executed, the back contamination of the subsequent recording material S did not occur even when the transfer member cleaning operation is not executed. Further, in these cases, the transfer member cleaning operation is not executed in the sheet interval step, so that a time from a start of the job to an end of the job can be shortened.

Thus, in this embodiment, the flap printing information acquiring portion (CPU) 12 acquires, as the flap printing information, image presence/absence information on presence/absence of the toner image to be transferred onto the flap in the case where the image is formed on the flap of which flap is open. On the basis of the image presence/absence information, in the case where the image (data, information) for transferring the toner image onto the flap of the first recording material S is present, the controller 11 carries out control so as to execute the transfer member cleaning operation in which the voltage of the same polarity as the normal charge polarity of the toner and the voltage of the opposite polarity to the normal charge polarity are alternately applied by the applying portion 63 after the first recording material S passed through the transfer portion N2 and before the second recording material S in continuous printing reaches the transfer portion N2, in the case where the image (data, information) for transferring the toner image onto the flap of the first recording material S is absent, the controller 11 carries out control so that the second recording material S reaches the transfer portion N2 without executing the transfer member cleaning operation after the first recording material S passes through the transfer portion N2. In this embodiment, the flap printing information acquiring portion 12 acquires the above-described image presence/absence information on the basis of a set length which is a length of the envelope excluding the flap in the conveying direction of the recording material S, indicated by the above-described recording material information and an image length which is a length of image information of the toner image to be transferred onto the envelope in the conveying direction of the recording material S. The image presence/absence information indicates that in the case where the image length is longer than the set length, the image information of the toner image to be transferred onto the flap of the envelope. As described above, according to this embodiment, in the case where not only an effect similar to the effect of the embodiment 1 is obtained but also the flap printing is not executed, it is possible to suppress that downtime becomes long due to the transfer member cleaning operation. Further, in this embodiment, the case where the flap printing is not executed can be discriminated with high accuracy.

Incidentally, in this embodiment, as the flap printing information, the flap open/close information and the image information were used, but as the flap printing information, execution or non-execution of the flap printing may be discriminated using only the image information without using the flap open/close information. That is, in the case where the first recording material S is the envelope on the basis of the above-described recording material information and the image information of the toner image to be transferred onto the flap of the first recording material S on the basis of the above-described image presence/absence information, the controller 11 is capable of carrying out control so as to execute the transfer member cleaning operation after the first recording material S passes through the transfer portion N2 and before the second recording material S reaches the transfer portion N2.

Further, in this embodiment, the execution or non-execution of the flap printing was discriminated by making the comparison between the length of the image data and the length of the envelope (length of the envelope excluding the flap), but the present invention is not limited thereto. It is only required that the presence/absence of the image data (toner image) in the region corresponding to the flap can be discriminated. For example, the presence/absence of the image data in a region of an envelope (such as a regular envelope) with a set size, other than the main body portion may be discriminated on the basis of the image data.

In the case where input of the length of the flap of the envelope by the operator is not made, irrespective of the presence/absence of the image data in the region corresponding to the flap, formation of the image on the region corresponding to the flap may also be made non-execution. That is, in that case, the formation of the image is made possible only on the main body portion of the envelope, and the transfer member cleaning operation for each passing of the envelope through the secondary transfer portion N2 can be made non-execution.

Embodiment 4

Next, another embodiment of the present invention will be described. The basic structure and operation of an image forming apparatus of this embodiment are the same as those of the image forming apparatuses of the embodiments 1 to 3. Therefore, in the image forming apparatus of this embodiment, elements having the same or corresponding functions or structures as those of the image forming apparatuses of the embodiments 1 to 3 are denoted by the same reference numerals or symbols as those of the embodiment 1, and detailed description thereof will be omitted.

In this embodiment, similarly as in the embodiment 2, in the case where the recording material S used in the image formation is the envelope, the flap printing information is acquired, and then execution or non-execution of the transfer member cleaning operation is discriminated. In the embodiment 2, as the flap printing information, the flap open/close information based on the setting made by the operator was used. On the other hand, in this embodiment, as the flap open/close information, a detection result of an open/close state of the flap by a flap open/close detecting means is used.

2. Flap Open/Close Detecting Means

FIG. 11 is a schematic sectional view of the image forming apparatus 1 in this embodiment. Further, FIG. 12 is a schematic block diagram showing a control constitution of the image forming apparatus 1 of this embodiment. As shown in FIG. 11, in this embodiment, the image forming apparatus 1 includes a recording material detecting sensor 30 in a conveying path of the recording material S. The recording material detecting sensor 30 is provided downstream of the feeding portion 2 and upstream of the registration roller pair 27 with respect to the conveying direction of the recording material S. Particularly, in this embodiment, the recording material detecting sensor 30 is disposed in the neighborhood of a side upstream of the registration roller pair 27 with respect to the conveying direction of the recording material S. The recording material detecting sensor 30 detects the presence/absence of the recording material S within a detection range. As the recording material detecting sensor 30, it is possible to appropriately use a sensor available from, for example, known sensors. For example, the recording material detecting sensor 30 includes a flag movable in contact with the recording material S, a projection portion, and a light receiving portion for receiving detection light from the projection portion, and detects the presence/absence of the recording material S by detecting a change in transmission/shielding of detected light by movement of the flag.

As shown in FIG. 12, the recording material detecting sensor 30 is connected to the controller 11. A signal (information) indicating a detection result of the recording material detecting sensor 30 is inputted to the controller 11. The controller 11 calculates a length of the recording material in the conveying direction with use of the detection result of the recording material detecting sensor 30 (herein, also referred to as a "detection length"). Specifically, the controller 11 calculates the detection length of the recording material S on the basis of a time from arrival of the reading end of the recording material S at a detection position of the recording material detecting sensor 30 until the trailing end of the recording material S passes through the detection position. As output of the recording material detecting sensor 30, a state in which the recording material S is present in the detection position when the leading end of the recording material S passes through the detection position of the recording material detecting sensor 30 is formed, and therefore, sensor output changes from "OFF" to "ON". On the other hand, when the trailing end of the recording material S passes through the detection position of the recording material (paper) detecting sensor 30, a state in which the recording material S is not present, i.e., absent in the detecting position is formed, and therefore, the sensor output changes from "ON" to "OFF". For this reason, a detection length of the recording material S can be calculated from the product of a time until the sensor output of the paper detecting sensor 30 changed to "OFF" after the sensor output changes from "OFF" to "ON" by a conveying (feeding) speed of the recording material S.

In this embodiment, in the case where the envelope is set as the recording material S used in the image formation, the controller 11 makes comparison between a preset length of the recording material S in the conveying direction (herein, also referred to as a "set length") and the detection length of the recording material S. The set length of the recording material S is a length of a portion excluding the flap in the case where the recording material S is the envelope. Further, as a result of the comparison, in the case where the detection length of the recording material S is longer than the set length of the recording material S, discrimination that the flap is open is made.

3. Transfer Member Cleaning Operation in Case that Envelope is Used

FIG. 13 is a flow chart showing an outline of a procedure of a job in this embodiment. In this case, description will be made on the assumption that the kind of the recording materials S used in one job is the same.

First, when the operator makes a sheet setting in the operating portion 4 (or the external device 200), the controller 11 (the CPU 12) acquires the information on the kind of the recording material S (S400). Then, the controller 11 discriminates whether or not the recording material S used in the image formation is the envelope (S401). Further, in the case where the controller 11 discriminated in S401 that the recording material S is the envelope, the operator starts the job (S402), and then acquires the detection length of the recording material S on the basis of the detection result of the recording material detecting sensor 30 (S403). Then, the controller 11 makes comparison between the detection length of the recording material S and the set length of the recording material S (S404). In the case where the controller 11 discriminated in S404 that the detection length of the recording material S is longer than the set length of the recording material S, after transfer of the 1 Image onto the recording material S is ended (S405), the controller 11 executes the transfer member cleaning operation (S406). Thereafter, the controller 11 discriminates whether or not a residual (remaining) Image in the job is 0 (zero) Image (no image) (S407). In the case where the controller 11 discriminated in S407 that the residual Image is larger than the 0 Image (the residual Image is not the 0 Image), the procedure returns to the process of S403, and the processes S403 to S407 are repeated until the residual Image becomes the 0 Image. In the case where the controller 11 discriminated in S407 that the residual Image is the 0 Image, the controller 11 ends the job (S408), and ends the control.

Further, in the case where the controller 11 discriminated in S401 that the recording material S is not the envelope or in the case where the controller 11 discriminated in S404 that the detection length of the recording material S is not longer than the set length of the recording material S, the controller 11 starts the job (S409), and after transfer of all Images on the recording materials S in the job is completed (S410), the controller 11 executes the transfer member cleaning operation (S411). Thereafter, the controller 11 ends the job (S408), and ends the control.

Incidentally, in FIG. 13, the kind of the recording material S used in the single job was the same, but even in a job in which a plurality of kinds of recording materials S are used, similarly as described above, the transfer member cleaning operation may only be required to be executed every passing of the envelope, fed in a state in which the flap is open, through the secondary transfer portion N2 in the case where open of the flap of the envelope is detected.

In this embodiment, when effect confirmation similar to the effect confirmation in the embodiment 1 is made, even in the case where the flap printing is executed by feeding the envelope in the state in which the flap is open, the back contamination of the subsequent recording material S was capable of being suppressed.

Further, in the case where the flap printing in which the envelope is fed in a state in which the flap is closed is not executed, the back contamination of the subsequent recording material S did not occur even when the transfer member cleaning operation is not executed. Further, in this case, the transfer member cleaning operation is not executed in the sheet interval step, so that a time from a start of the job to an end of the job can be shortened.

Incidentally, in this embodiment, the open/close state of the flap was discriminated on the basis of the detection result of the length of the envelope, conveyed along the conveying path, in the recording material conveying direction, but is not limited thereto, and the open/close state of the flap may only be required to be discriminated. For example, a mechanism for acquiring information of the length, in the conveying direction, of the envelope accommodated or stacked on the feeding portion 2 is provided and the open/close state of the flap may be discriminated using the acquiring length information similarly as in this embodiment. Further, an image pick-up element or the like for acquiring information of a shape of the envelope conveyed along the conveying path is provided, and the open/close state of the flap may be discriminated on the basis of the presence/absence of a portion corresponding to a cut-away portion of the flap.

Thus, in this embodiment, the image forming apparatus 1 includes the sensor (recording material detecting sensor) 30 for detecting the recording material S conveyed toward the transfer portion N2. The flap printing information acquiring portion (CPU) 12 acquires the flap printing information on the open/close state of the flap of the envelope on the basis of the set length which is a length of a portion excluding the flap of the envelope, in the conveying direction of the recording material S, indicated by the recording material information on the kind of the recording material S and on the basis of the detection length which is a length from the leading end to the trailing end of the envelope, in the conveying direction of the recording material S, indicated by the detection result of the sensor 30. The above-described flap open/close information indicates that the flap is open in the case where the detection length is longer than the set length.

As described above, according to this embodiment, in the case where not only an effect similar to the effect of the embodiment 1 is obtained but also the flap printing is not executed, it is possible to suppress that downtime becomes long due to the transfer member cleaning operation. Further, in this embodiment, the flap open/close information is automatically acquired, so that a setting load of the operator can be reduced.

Incidentally, the flap open/close information acquiring method in this embodiment can also be combined with the discrimination of the execution or non-execution of the flap printing based on the image information in the embodiment 3.

Other Embodiments

As described above, the present invention was described based on specific embodiments, but is not limited to the above-described embodiments.

The image forming apparatus is not limited to the tandem-type image forming apparatus, but, for example, an image forming apparatus of another type, such as a constitution in which toner images of a plurality of colors are successively formed on a single photosensitive member and are primary-transferred and then are secondary-transferred onto the recording material, may be used. Further, the image forming apparatus is not limited to the full-color image forming apparatus, but may also be a monochromatic or mono-color image forming apparatus. For example, in a monochromatic image forming apparatus including a single image forming portion for forming a single color image, the present invention is capable of being applied to a transfer portion where the toner image is transferred from the photosensitive member onto the recording material. Further, the image forming apparatus can be carried out in various apparatuses, such as printers, various printing machines, copying machines, facsimile machines, and multi-function machines.

Further, the transfer member is not limited to the transfer roller. The transfer member may be, in addition to rotatable members of a roller shape, an endless belt shape, and a brush shape, or fixedly provided members of a pad shape, a blade shape, a film shape, and a brush shape.

Further, in the above-described embodiments, the constitution in which the transfer voltage was applied to the outer secondary transfer roller 45*b* was employed, but a constitution in which the transfer voltage is applied to the inner secondary transfer roller 45*a* may also be employed. In that case, a constitution in which the cleaning voltage is applied to the inner secondary transfer roller 45*a* may only be required to be employed.

According to the present invention, in the case where the image is formed on the flap of the envelope, it is possible to suppress that the subsequent recording material is contaminated with the toner protruded from the flap and deposited on the transfer member.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-027854 filed on Feb. 25, 2023, which is hereby incorporated by reference herein in its entirety.

What is claimed is:

1. An image forming apparatus comprising:

an image bearing member;

a toner image forming portion configured to form a toner image on the image bearing member;

a transfer member forming a transfer portion between the transfer member and the image bearing member while in contact with the image bearing member and configured to transfer the toner image from the image bearing member onto a recording material in the transfer portion;

an applying portion configured to apply a voltage for transferring the toner image from the image bearing member onto the recording material;

an acquiring portion configured to acquire recording material information on a kind of the recording material;

a flap printing information acquiring portion configured to acquire flap printing information on whether or not flap printing for transferring the toner image on a flap of the envelope is capable of being executed; and a controller capable of controlling the applying portion, wherein in continuous printing, in which toner images are continuously transferred onto a first recording material and a second recording material, in a case that the first recording material is determined to be an envelope on the basis of the recording material information, the controller carries out control so that a transfer member cleaning operation, in which a first cleaning voltage of the same polarity as a normal charge polarity of toner and a second cleaning voltage of an opposite polarity to the normal charge polarity of the toner are alternately applied by the applying portion, is selectively executed after the first recording material passes through the transfer portion and before the second recording material reaches the transfer portion, wherein in a case that the first recording material is determined to be the envelope on the basis of the recording material information and that the flap printing is determined to be capable of being executed on the first recording material on the basis of the flap printing information, the controller carries out control so that the transfer member cleaning operation is selectively executed after the first recording material passes through the transfer portion and before the second recording material reaches the transfer portion, wherein the flap printing information acquiring portion acquires, as the flap printing information, flap open/close information on an open/close state of the flap of the envelope, and wherein in a case that the first recording material is determined to be the envelope on the basis of the recording material information, when the flap of the first recording material is determined to be open on the basis of the flap open/close information, the controller carries out control so that the transfer member cleaning operation is executed after the first recording material passes through the transfer portion and before the second recording material reaches the transfer portion, and when the flap of the first recording material is determined to be closed on the basis of the flap open/close information, the controller carries out control so that after the first recording material passes through the transfer portion, the second recording material reaches the transfer portion without executing the transfer member cleaning operation.

2. An image forming apparatus according to claim 1, wherein the flap printing information acquiring portion acquires the flap open/close information on the basis of an operation of an operator.

3. An image forming apparatus according to claim 1, further comprising a sensor configured to detect the recording material conveyed toward the transfer portion, wherein the flap printing information acquiring portion acquires the flap open/close information on the basis of a set length, indicated by the recording material information, which is a length of the envelope excluding the flap in a conveying direction of the recording material and a detected length, indicated by a detection result of the sensor, which is a length from a leading end to a trailing end of the envelope in the conveying direction of the recording material.

4. An image forming apparatus according to claim 1, wherein the flap printing information acquiring portion acquires, as the flap printing information, image presence/absence information on presence/absence of image information of the toner image to be transferred onto the flap of the envelope, and wherein in a case that the first recording material is determined to be the envelope on the basis of the recording material information and that the image information of the toner image to be transferred onto the flap of the first recording material is determined to be present on the basis of the image presence/absence information, the controller carries out control so that the transfer member cleaning operation is executed after the first recording material passes through the transfer portion and before the second recording material reaches the transfer portion.

5. An image forming apparatus according to claim 1, wherein in the transfer member cleaning operation, each of the first cleaning voltage and the second cleaning voltage is applied in a period in which the transfer member rotates through one full revolution or more.

6. An image forming apparatus according to claim 1, wherein the controller controls the applying portion so as to apply each of the first cleaning voltage and the second cleaning voltage to the transfer member by constant-current control.

7. An image forming apparatus according to claim 1, wherein in the transfer member cleaning operation, the controller controls the applying portion so as to apply the first cleaning voltage and the second cleaning voltage to the transfer member consecutively during one full revolution of the transfer member.

8. An image forming apparatus comprising:

an image bearing member;

a toner image forming portion configured to form a toner image on the image bearing member;

a transfer member forming a transfer portion between the transfer member and the image bearing member while in contact with the image bearing member and configured to transfer the toner image from the image bearing member onto a recording material in the transfer portion;

an applying portion configured to apply a voltage for transferring the toner image from the image bearing member onto the recording material;

an acquiring portion configured to acquire recording material information on a kind of the recording material;

a flap printing information acquiring portion configured to acquire flap printing information on whether or not flap printing for transferring the toner image on a flap of the envelope is capable of being executed; and a controller capable of controlling the applying portion, wherein in continuous printing, in which toner images are continuously transferred onto a first recording material and a second recording material, in a case that the first recording material is determined to be an envelope on the basis of the recording material information, the controller carries out control so that a transfer member cleaning operation, in which a first cleaning voltage of the same polarity as a normal charge polarity of toner and a second cleaning voltage of an opposite polarity to the normal charge polarity of the toner are alternately applied by the applying portion, is selectively executed after the first recording material passes through the transfer portion and before the second recording material reaches the transfer portion, wherein in a case that the first recording material is determined to be the envelope on the basis of the recording material information and that the flap printing is determined to be capable of being executed on the first recording material on the basis of the flap printing information, the controller carries out control so that the transfer member cleaning operation is selectively executed after the first recording material passes through the transfer portion and before the second recording material reaches the transfer portion, wherein in a case that an image is to be formed on the envelope of which flap is open, the flap printing information acquiring portion acquires, as the flap printing information, image presence/absence information on presence/absence of the toner image to be transferred onto the flap, and wherein when the toner image is determined to be transferred onto the flap of the first recording material on the basis of the image presence/absence information, the controller carries out control so that the transfer member cleaning operation is executed after the first recording material passes through the transfer portion and before the second recording material reaches the transfer portion, and when no toner image is determined to be transferred onto the flap of the first recording material on the basis of the image presence/absence information, the controller carries out control so that after the first recording material passes through the transfer portion, the second recording material reaches the transfer portion without executing the transfer member cleaning operation.

9. An image forming apparatus comprising:

an image bearing member;

a toner image forming portion configured to form a toner image on the image bearing member;

a transfer member forming a transfer portion between the transfer member and the image bearing member while in contact with the image bearing member and configured to transfer the toner image from the image bearing member onto a recording material in the transfer portion;

an applying portion configured to apply a voltage for transferring the toner image from the image bearing member onto the recording material;

an acquiring portion configured to acquire recording material information on a kind of the recording material; and a controller capable of controlling the applying portion, wherein in continuous printing, in which toner images are continuously transferred onto a first recording material and a second recording material, in a case that the first recording material is determined to be an envelope on the basis of the recording material information, the controller carries out control so that a transfer member cleaning operation, in which a first cleaning voltage of the same polarity as a normal charge polarity of toner and a second cleaning voltage of an opposite polarity to the normal charge polarity of the toner are alternately applied by the applying portion, is selectively executed after the first recording material passes through the transfer portion and before the second recording material reaches the transfer portion, and wherein in a case that the first recording material is not determined to be the envelope on the basis of the recording material information, the controller controls the applying portion so as to apply a predetermined bias to the transfer member without executing the transfer member cleaning operation.

10. An image forming apparatus according to claim 9, wherein the predetermined bias is a bias of the opposite polarity to the normal charge polarity of the toner, and the controller carries out constant-current control so that a predetermined current flows through the transfer member.

* * * * *